US012067518B2

(12) United States Patent
Sheridan

(10) Patent No.: US 12,067,518 B2
(45) Date of Patent: Aug. 20, 2024

(54) METHOD AND SYSTEM FOR MEASURING COMPUTABLE CLIMATE ACTION TRANSACTIONS AS A BENEFIT, GIFT, ENGAGEMENT, INCENTIVE, RECOGNITION, REWARD, TEAMBUILDING AND TRAINING TOOL

(71) Applicant: Leslie Sheridan, Clearlake, CA (US)

(72) Inventor: Leslie Sheridan, Clearlake, CA (US)

( * ) Notice: Subject to any disclaimer, the term of this patent is extended or adjusted under 35 U.S.C. 154(b) by 404 days.

(21) Appl. No.: 17/371,691

(22) Filed: Jul. 9, 2021

(65) Prior Publication Data

US 2022/0012751 A1 Jan. 13, 2022

Related U.S. Application Data

(60) Provisional application No. 63/050,047, filed on Jul. 9, 2020.

(51) Int. Cl.
*G06Q 10/0639* (2023.01)
*G06Q 30/018* (2023.01)
(Continued)

(52) U.S. Cl.
CPC ....... *G06Q 10/0639* (2013.01); *G06Q 30/018* (2013.01); *G06Q 10/0637* (2013.01);
(Continued)

(58) Field of Classification Search
CPC .............. G06Q 30/018; G06Q 10/0637; G06Q 10/0639; G06Q 30/0201; G06Q 30/0214; G06Q 50/01; G06Q 50/205; G06Q 50/28
(Continued)

(56) References Cited

U.S. PATENT DOCUMENTS 9,824,404 B2 11/2017 Astore
2005/0283425 A1* 12/2005 Grove ............... G06Q 30/08
705/37

(Continued)

OTHER PUBLICATIONS

Du, et al. Platform-Led Green Advertising: Promote The Best or Promote by Performance, 128 Transportation Research Part E: Logistics and Transportation Review at pp. 115-131 (2019) (Year: 2019).*

*Primary Examiner* — Charles Guiliano
(74) *Attorney, Agent, or Firm* — Procopio, Cory, Hargreaves & Savitch LLP

(57) ABSTRACT

Techniques are provided for receiving and processing vetting, criteria, and certification parameters of entities intending to offer sustainable products and services to compute climate impact measurement, rating, and badge elevation output parameters. The techniques further receive informational input parameters about the sustainable products and services to offer the sustainable products and services in the form of benefits, gifts, incentives, recognition, rewards, engagement, teambuilding, and training tools. The techniques further generate, monitor, and update purchasing funds and offering flows in response to purchases or offerings of the sustainable products and services. The techniques further monitor how each recipient of the sustainable products and services or of the offering of benefits, gifts, incentives, recognition, rewards, engagement, teambuilding, and training tools further shares sustainable products and services or of the offering of benefits, gifts, incentives, recognition, rewards, engagement, teambuilding, and training tools to contacts in their respective social or digital networks.

20 Claims, 27 Drawing Sheets

(51) Int. Cl.
*G06Q 10/0637* (2023.01)
*G06Q 30/0201* (2023.01)
*G06Q 30/0214* (2023.01)
*G06Q 50/00* (2012.01)
*G06Q 50/20* (2012.01)
*G06Q 50/28* (2012.01)

(52) U.S. Cl.
CPC ..... *G06Q 30/0201* (2013.01); *G06Q 30/0214* (2013.01); *G06Q 50/01* (2013.01); *G06Q 50/205* (2013.01); *G06Q 50/28* (2013.01)

(58) Field of Classification Search
USPC ........................................................ 705/7.29
See application file for complete search history.

(56) References Cited

U.S. PATENT DOCUMENTS

| | | | | |
|---|---|---|---|---|
| 2013/0132233 | A1* | 5/2013 | Rothley | G06Q 30/018 |
| | | | | 705/26.35 |
| 2014/0337145 | A1* | 11/2014 | Phung | G06Q 30/0277 |
| | | | | 705/14.73 |
| 2016/0253710 | A1* | 9/2016 | Publicover | H04W 4/21 |
| | | | | 705/14.66 |

* cited by examiner

FIG. 6

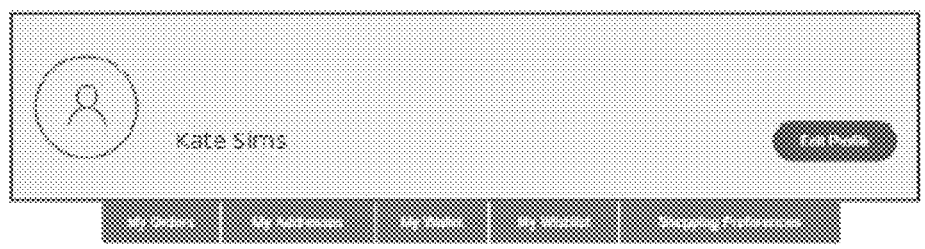
My Wishlist
View favorite products you've saved to your wishlist.
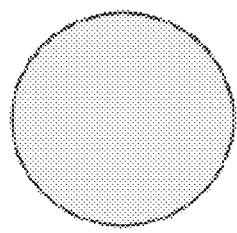
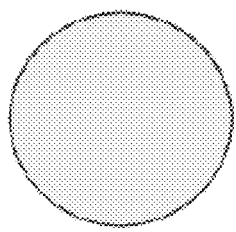
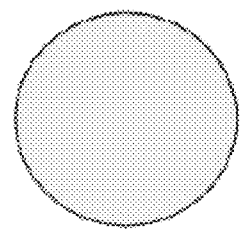
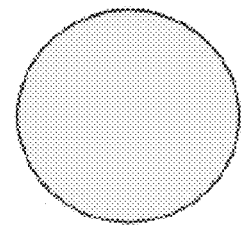
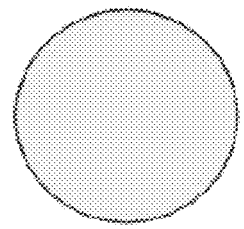
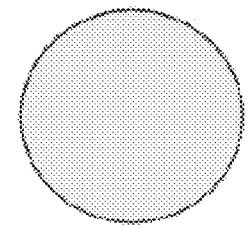
FIG. 10

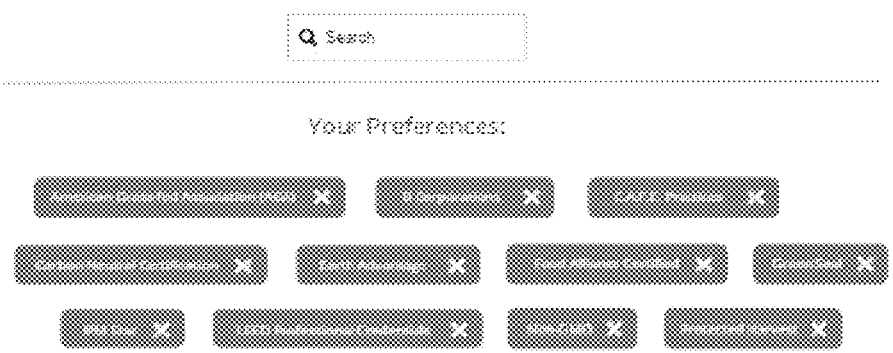
FIG. 11

FIG. 12

Business Profile- My Wallet
PLANET CENTS
About    Contact
Impact Tracker
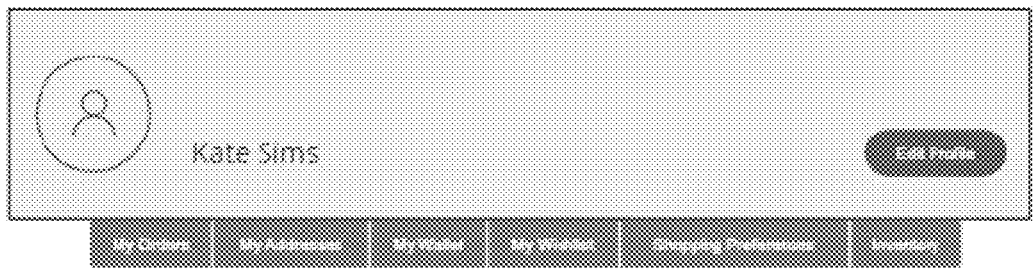
My Wallet
Save your credit and debit card details for faster checkout.
| Credit Card | Expiration Date | | |
|---|---|---|---|
| MasterCard (2751) | 06/2022 | ✓ Default Card | ∨ |
| Visa (3627) | 11/2024 | Set as Default | ∨ |
FIG. 13

FIG. 14
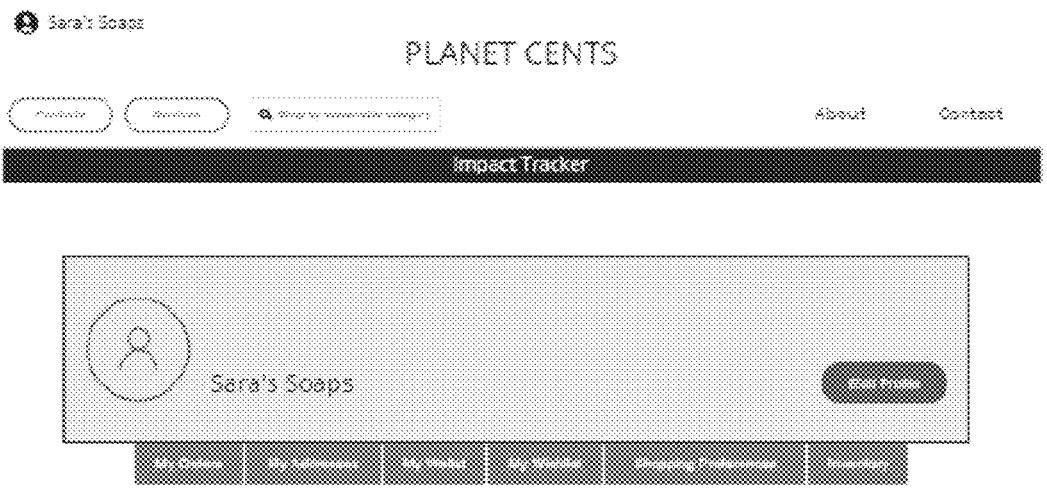
My Wishlist
View favorite products you've saved to your wishlist.
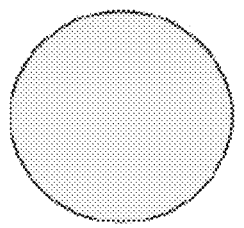
Product Name
$Price
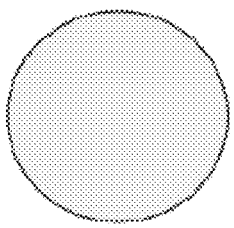
Product Name
$Price
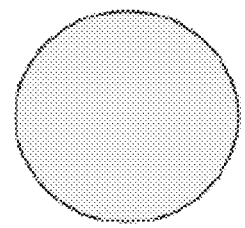
Product Name
$Price
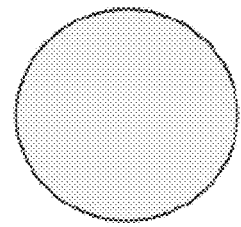
Product Name
$Price
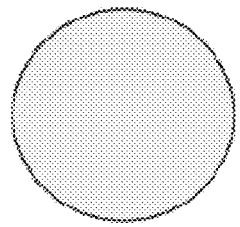
Product Name
$Price
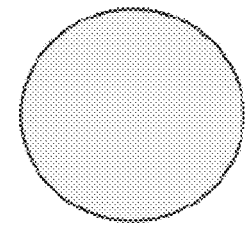
Product Name
$Price

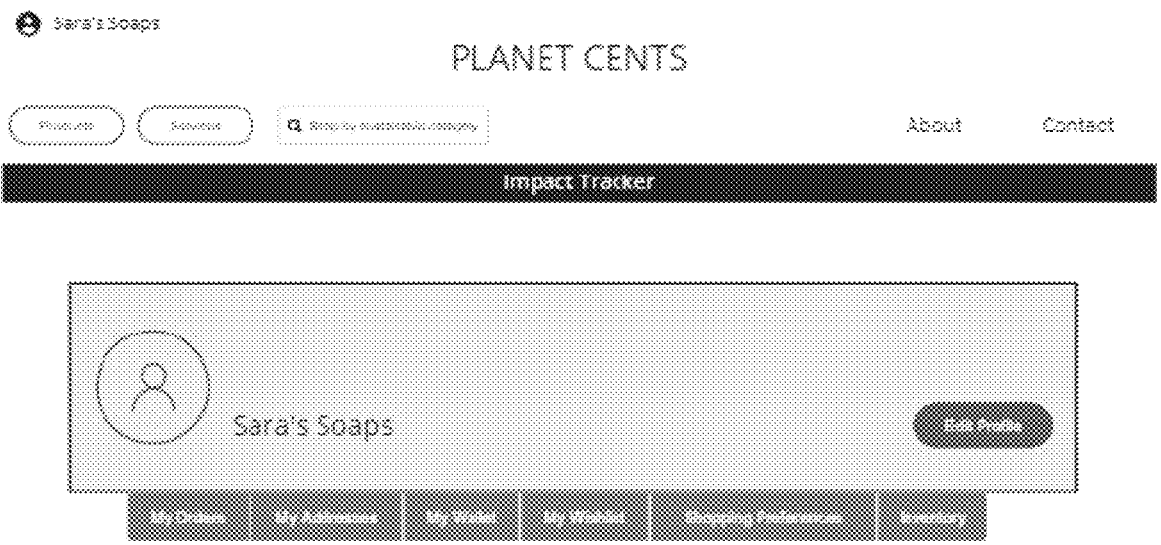
Shopping Preferences
Search for and save the type of sustainability you prefer to shop by.
Your Preferences:
FIG. 15

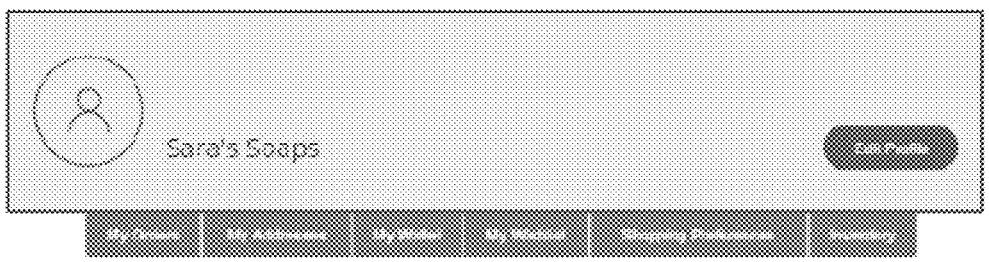
My Inventory
Manage your store's inventory.
| Name | Type | SKU | Price | In Stock | |
|---|---|---|---|---|---|
| Product Name | Physical | #0000 | $100.00 | 12 | ••• |
| Product Name | Physical | #0000 | $100.00 | 12 | ••• |
| Product Name | Physical | #0000 | $100.00 | 12 | ••• |
| Product Name | Physical | #0000 | $100.00 | 12 | ••• |
FIG. 16

THE PROBLEM

Organizations are losing customers, employees, investors, partners, and suppliers due to their action/inaction on Corporate Social Responsibility (CSR) and Environmental, Social and Governance (ESG)

Studies and trends illustrate that in order to attract and retain customers, employees, investors, partners, and suppliers, organizations must stop "greenwashing." Proof of measureable action is now demanded.

An existing employee skills shortage worsens this situation.

FIG. 18

Our Online Market
- Tiered memberships to access our market
- Markup fees on the products and services (including gift & loyalty cards)

Our Intern & Volunteer Packages
- Markup fees on the fees our volunteer Partners charge
- Markup fees on the interns we bring them

Our University
- Markup fees on educational offerings & experiences there

FIG. 24

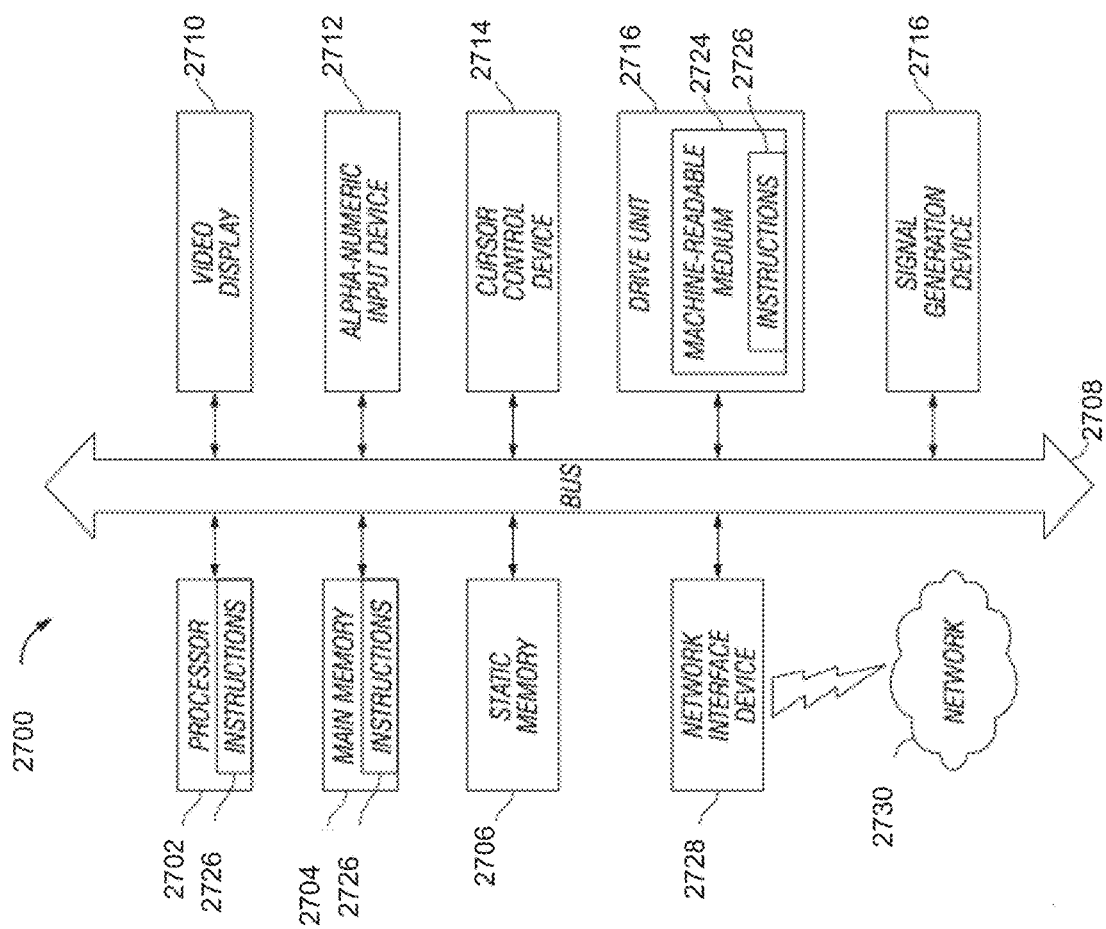

METHOD AND SYSTEM FOR MEASURING COMPUTABLE CLIMATE ACTION TRANSACTIONS AS A BENEFIT, GIFT, ENGAGEMENT, INCENTIVE, RECOGNITION, REWARD, TEAMBUILDING AND TRAINING TOOL

CROSS REFERENCE TO RELATED APPLICATIONS

This patent application claims priority from U.S. provisional patent application Ser. No. 63/050,047, Method And System For Measuring Computable Climate Action Transactions As A Benefit, Incentive And Reward, filed Jul. 9, 2020, the entirety of which is incorporated herein by this reference thereto.

BACKGROUND OF THE INVENTION

Technical Field

This invention relates generally to the field of a comprehensive online platform for accessibility to measurable sustainable purchasing action events that mitigate climate change, from multiple-party perspectives and portals. More specifically, this invention relates to a method and system for climate action as a benefit, gift, incentive, recognition, and reward offering.

Description of the Related Art

Presently, companies provide online platforms on which sellers may provide their wares and buyers may make purchases therefrom. Typically, each online marketplace platform is self-contained and is only concerned with the sales-related data. No present day online marketplace platform tracks the environmental impact of the selling of and purchasing of such wares on the environment in a transparent way to the variety of users of the platform.

SUMMARY

Techniques are provided for receiving vetting parameters, criteria parameters, and certification parameters of entities intending to offer products and services to compute impact measurement, rating, and badge elevation output parameters by processing the vetting parameters, the criteria parameters, and the certification parameters. The techniques further receive informational input parameters about the products and services to offer the products and services in the form of benefits, gifts, incentives, recognition, rewards, engagement, and training tools. The techniques further generate, monitor, and update purchasing funds and offering flows in response to purchases or offerings of the products and services. The techniques further monitor how each recipient of the products and services or of the offering of benefits, gifts, incentives, recognition, rewards, engagement, and training tools further shares products and services or of the offering of benefits, gifts, incentives, recognition, rewards, engagement, and training tools to contacts in their respective social or digital networks.

Techniques are provided regarding a products-as-a-service entity to facilitate and enable the selling of environmental services and products to organizations, their customers, employees, partners and suppliers worldwide. The innovation creates, monitors, and updates in real-time an online hub of a volunteer organizational portal, a client portal, a consumer portal, an education portal, and a beneficiary portal, and seller portal, which drives and is configured to enable millions of end-users into conversions of actionable and computably measurable events at environmental organizations. The seller portal includes both companies selling their own environmental products and services, as well as companies selling the environmental products and services of others. The innovation generates, monitors, and maintains a business-to-consumer (B2C), a business-to-business (B2B), and a business-to-business-to-consumer (B2B2C) online clearinghouse marketplace (e.g., storage and correspondingly configured processors) of products and services. The innovation provides an online climate change university with partners in the educational arena. It also provides buyers, sellers, and partners with the opportunity to engage with one another for mutual benefit. These partners come from the benefit, customer, and employee attraction and retention, benefit, education, engagement (e.g., Client/Customer and employee engagement), incentive, gift, recognition, and reward industry spaces. The platform also enables the selling of environmental services and products directly to consumers, (Direct to Consumer (DTC) aka B2C) and Business to Business (B2B,) affiliated or not affiliated with the organizations who are the clients of the platform, their customers, employees, partners or suppliers. As such, general consumers and organizations can directly access the platform.

BRIEF DESCRIPTION OF THE DRAWINGS

One or more embodiments of the present invention are illustrated by way of example and not limitation in the figures of the accompanying drawings, in which like references indicate similar elements.

Figure 6:
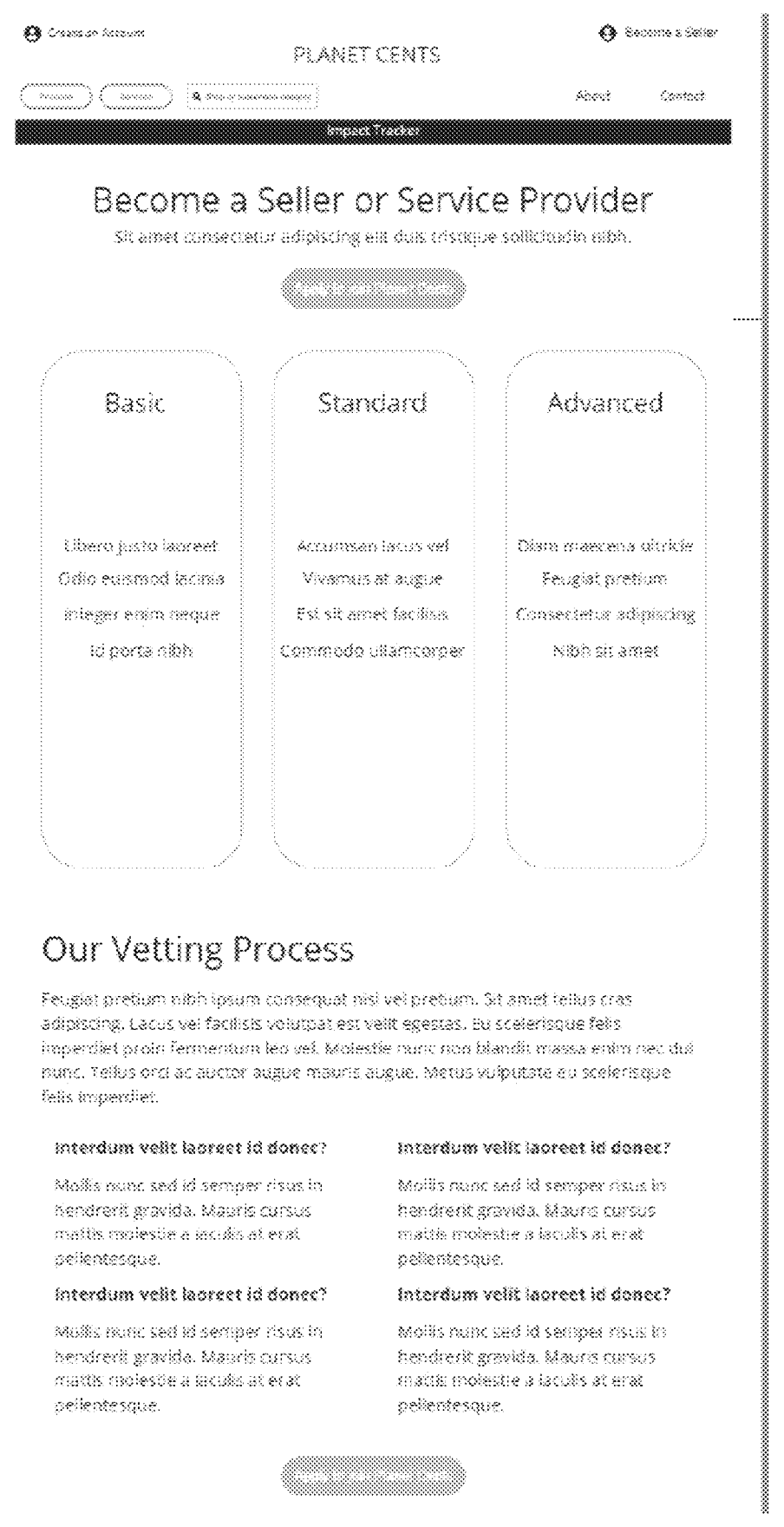

FIG. 6 is a sample screenshot of an information and application page, in accordance with an embodiment;

FIG. 10 is a sample screenshot of a customer wish list page, in accordance with an embodiment;

FIG. 11 is a sample screenshot of a sustainable preferences list page, in accordance with an embodiment;

FIG. 12 is a sample screenshot of a business orders page, in accordance with an embodiment;

FIG. 13 is a sample screenshot of a business wallets page, in accordance with an embodiment;

FIG. 14 is a sample screenshot of a business wish list page, in accordance with an embodiment;

FIG. 15 is a sample screenshot of a business sustainable preferences page, in accordance with an embodiment;

FIG. 16 is a sample screenshot of a business inventory page, in accordance with an embodiment;

FIG. 18 is a schematic diagram depicting a high-level description of some of the problems, in accordance with an embodiment;

FIG. 24 is a schematic diagram depicting a possible fee structure regarding the packages as offered by the hub, in accordance with an embodiment;

FIG. 27 is a block schematic diagram of a system in the exemplary form of a computer system according to an embodiment.

DETAILED DESCRIPTION

Figure 1:
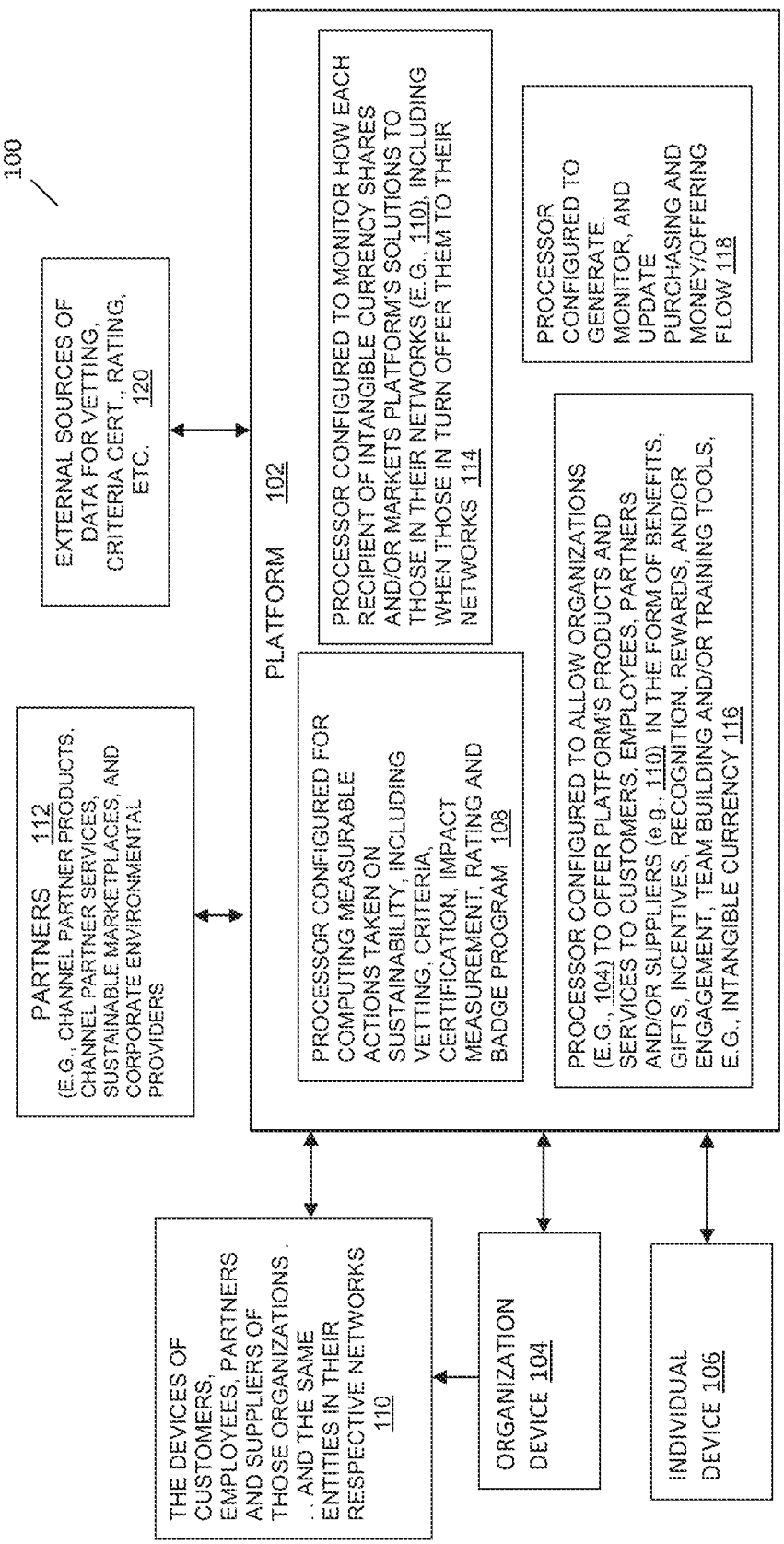
FIG. 1 is a schematic diagram of a high-level architecture of the network environment, in accordance with an embodiment.

Techniques are provided for receiving vetting parameters, criteria parameters, and certification parameters of entities intending to offer products and services to compute impact measurement, rating, and badge elevation output parameters by processing the vetting parameters, the criteria parameters, and the certification parameters. Examples from an expansive list of over 100 of these include, but are not limited to: B Corporation, Carbon-free, Energy Star, Fair Trade, and Organic certifications. As such, the innovation involves a high degree of collaboration with certification and ratings organizations.

The techniques further receive informational input parameters about the products and services to offer the products and services in the form of benefits, gifts, incentives, recognition, rewards, engagement, and training tools. The techniques further generate, monitor, and update purchasing funds and offering flows in response to purchases or offerings of the products and services. The techniques further monitor how each recipient of the products and services or of the offering of benefits, gifts, incentives, recognition, rewards, engagement, and training tools further shares products and services or of the offering of benefits, gifts, incentives, recognition, rewards, engagement, and training tools to contacts in their respective social or digital networks.

Techniques are provided regarding a products-as-a-service entity to facilitate and enable the selling of environmental services and products to organizations, their customers, employees, partners and suppliers worldwide. The innovation creates, monitors, and updates in real-time an online hub of a volunteer organizational portal, a client portal, a consumer portal, an education portal, and a beneficiary portal, and seller portal, which drives and is configured to enable millions of end-users into conversions of actionable and computably measurable events at environmental organizations. This also includes Channel Partners who do not sell environmental products or services, but sell services related to the organization usage and implementation of the innovation as a benefit, engagement, gift, incentive, recognition and reward tool. Examples of this include, but are not limited to: employee benefit providers helping organizational Clients implement the solution as an employee benefit; customer incentive and loyalty companies helping the same embed that aspect of the innovation into their customer models; recognition and reward companies providing assistance in configuring and implementing the innovation into their existing programs and processes.

The seller portal includes both companies selling their own environmental products and services, as well as companies selling the environmental products and services of others. The innovation generates, monitors, and maintains a business-to-consumer (B2C), a business-to-business (B2B), and a business-to-business-to consumer (B2B2C) online clearinghouse marketplace (e.g., storage and correspondingly configured processors) of products and services. The innovation provides an online climate change university with partners in the educational arena. It also provides buyers, sellers, and partners with the opportunity to engage with one another for mutual benefit. These partners come from the benefit, customer, and employee attraction and retention, benefit, education, engagement (e.g., Client/Customer and employee engagement), incentive, gift, recognition, and reward industry spaces. The platform also enables the selling of environmental services and products directly to consumers, (Direct to Consumer (DTC) aka B2C) and Business to Business (B2B,) affiliated or not affiliated with the organizations who are the clients of the platform, their customers, employees, partners or suppliers. As such, general consumers and organizations can directly access the platform.

Overview

The earth's global climate crisis is a problem acknowledged by many respected and revered scientists worldwide. Such global climate crisis may challenge the survival of all living beings, which is already posing threats to health, economies, life, and world security. In 2017, there were 65 million climate refugees, and that number has steadily climbed since then.

In an embodiment, education is an important part of this innovation, and is embedded in its functionality. For example, during the course of a visit to and usage of the platform, users are presented with mini tidbits of education with the intent of getting them educated about sustainability, and the importance of shopping sustainably. This is in keeping with the fact that people do not take action without knowledge and understanding of the problem with their current actions. The overarching goal is to use sustainable purchasing as a mechanism to reverse climate change. This platform enables this to happen. The educational/university element of this platform may contain a host of educational partners, as well. Examples of universities may include universities such as Harvard, online courses such as Brilliant, and organizations which offer hands-on learning experiences such as the Sierra Club or Habitat for Humanity, (e.g. building green houses.). Thus, the partners are both on and offline educators. Further included is a number of product and service partners such as in the following areas: CSR, customer benefits, recognition, and loyalty, education, ESG, employment, (e.g., benefits, HRO's and RPO's,) technology, vetting, and other organizations who would benefit from the platform.

It should be appreciated that through the innovative system's CSR and ESG partners, the areas of environmental impact may be tracked on the platform. Such tracked data may be made transparent to consumers, employees, investors, partners, and suppliers via their respective portal displays on their respective devices. This may include a stock-exchange-like ticker display.

In an embodiment, a computer-implemented platform, which may be referred to as Planet Cents Central,™ is configured to unite individuals, organizations, and governments, through their respective digital devices, to solve such climate crisis much sooner than the United Nation's current 10-year deadline. Examples of the digital devices may include laptops, smartphones, digital tablets, personal computers, and upright computers. The innovation accomplishes these outcomes by driving millions of volunteers into non-profit pre-revenue environmental bootstrapped startups as well as non-profits, (Beneficiaries,) engaged in any aspect related to reversing climate change, including digital technologies for action for climate change mitigation and reduction of greenhouse gases (GHGs). The innovative platform may provide startups with free workers, volunteers, and donors for the purpose of to increasing the actions, scope, and progress of their missions. Further, since volunteers are apt to donate to non-profits and/or invest in startups with which they are engaged, the innovative platform enables and may provide more funding for such startups to forward their missions and solve the climate change problem.

The innovative platform enables organizations the opportunity to improve their Corporate Social Responsibility, (CSR), and Environmental and Social Governance, (ESG) ratings, reviews, and reports, to show measurable actions taken. For an organization to produce measurable actions that may result in good CSR and ESG report appears to get more critical by the day, because many know that large numbers of millennials and GenZers, (the fastest-growing generations) will not buy from, work for, or stay at companies practicing bad CSR and ESG. As a solution to the exodus of millennial and GenZ customer, employee, investor, partner, and supplier departures, this platform helps organizations attract and retain customers, employees, investors, partners and suppliers from these generations. This in turn enables the innovative platform to improve telecommunications and decrease processing power and bandwidth, because such platform eliminates many unnecessary steps in the attraction and retention process. For example, users of the platform may have direct access to startups that have practice good CSR and ESG, instead of clogging up the Internet with searching for such startups, transmitting many emails to various companies with the goal of learning how well they practice CSR and ESG. Multiply these clogging-up actions by millions of users and that sizably slows down the Internet. Its associated processing power leads to massive energy use, much of which is still derived from planet-destroying fossil fuels. An example of this is Bitcoin. Cambridge University estimates that it uses more energy than the whole of Argentina. This is definitely not sustainable. https://www.bbc.com/news/technology-56012952.

The innovative platform facilitates replacing the purchase of non-sustainable goods and services with sustainable ones, which radically overhauls the global supply chain and procurement processes. For example, the platform enables quick uploads and updates of sustainable products and services to the hub, which are is accessible to users, regardless of assigned role. For example, a startup, which has opted-in to Planet Cents, is able to upload information about a particular product or service and mark it as accessible to other users of the hub. In an embodiment, the platform is configured to allow a user to opt-in as a member having access to the hub or market. For instance, the platform may provide tiered membership, based on predefined user criteria and/or fees, for accessing corresponding products and services. On the other side, a user, perhaps a second startup, that needs such product or service and that wants a good CSR and/or ESG may go to the hub to manually search or, through the use of appropriate APIs, may have a processor use the API(s) to search for and find such product or service. Further, the second startup's API may incorporate the first startup's product or server using the appropriate API. This decreases our global carbon footprint substantially. Additionally, it gives organizations the opportunity to improve their CSR and ESG ratings, reviews, and reports, to show measurable actions taken.

It should be appreciated that some since concrete behaviors and studies indicate that consumers, employees, investors, partners, and suppliers are asking for, and in some cases demanding for measurable action, this innovative platform is configured to facilitate the reporting of such. Climate strikes and investor rebellions underscore the importance of this. Since organizations are at risk of losing customers, employees, investors, partners, and suppliers, the implementation of the innovative platform avoids and/or mitigates these risks.

In an embodiment, the platform enables people around the world to obtain educational informational data about climate change, sustainability, the circular economy, and triple bottom line. For example, the platform may have a university/education component with a specific set of APIs. Through the use of these APIs, the computer devices, such as listed above, may search for, browse, download, upload, execute online courses on, and/or incorporate into their system, informational data that are considered to be educational about climate change and/or the mitigation thereof. For instance, a young entrepreneur, who may have discovered or invented an approach or a mechanism for mitigating climate change, may quickly upload their informational data or APIs to or regarding their mechanism, for near instantaneous access by other devices. Increased education translates into increased actions towards saving our planet. In an embodiment, the platform is configured to enable sellers of educational services and products to charge a fee on educational offerings and/or experiences on the website. For instance, the platform may require the user to pay a certain amount to view an online course on reducing greenhouse emissions in the southern area of California. Such course may have been preapproved for engineering degree requirements or for a company's demonstration of practicing good CSR and ESG.

It should be appreciated that by this innovative platform, devices have quick access to the latest education and volunteering opportunities. Educating and volunteering fuels a new green workforce across the planet, which helps solve the current skilled-employee shortages in the labor market. In an embodiment, partners may opt-in to the platform and upload volunteer opportunities for making such opportunities available to potential volunteers. For instance, a partner device may be communicably connected to the hub on the cloud and may upload informational data about an opportunity. In an embodiment, the platform is configured to enable the partner to charge a fee to another entity, such as for example a bootstrapped startup, for the startup to offer the opportunity on its webpage, via the platform's APIs. In an embodiment, the platform may also charge a markup fee on the fees of the partner.

As a result of at least the above-described actions becoming the norm, there will be more pressure on companies, governments, and politicians to take measurable actions in keeping with preserving our planet. Thus, such companies, governments, and politicians, who embody a certain inertia towards change, for whatever the reasons, may easily use the platform or, through the platform's APIs, may incorporate specific aspects of the platform to expedite their own workflow. For example, a congressional committee doing research on existing climate change activities, may develop an internal program that, through the platform's APIs, monitors targeted mitigating companies, organizations, products and services, and educational informational data and updates their program on a periodic bases (e.g., daily) for aiding with their strategy in making or recommending policy decisions.

In an embodiment, the platform unites or combines, e.g., via the hub, what may be referred to as climate saviors or acting entities, clients, partners, and beneficiaries, and their devices, described in detail below.

Clients via client devices: In an embodiment, the platform is configured to allow worldwide individuals, (e.g., consumers), and organizations (e.g. B2B, B2C, B2B2C) to purchase work and volunteering opportunity packages using an intangible currency. It should be appreciated that a package may include a complete work assignment or volunteer assignment, a combination of both, a part of an assignment (work or volunteer), or more than one assignment (work and/or volunteer). An exemplary intangible currency is Planet Cents™. In an embodiment, each actor or party engaged with a climate action may receive or spend a certain amount of such currency, the monitoring and updating of which may be performed by using the platform's APIs. For instance, each actor may have a profile and assigned currency, which are stored on a database of the platform. In an embodiment, currency transaction monitoring, authenticating, verifying, and related data processing may be performed using blockchain technologies. In an embodiment, such packages may include volunteer opportunities at host organizations, known as our beneficiaries. The packages may include local, regional, national, and international volunteer opportunities, of different lengths, as well as for different volunteer ages. Such packages and volunteer opportunities are accessible through configured interfaces of the hub, such as interfaces for the types of devices described above. It should be appreciated that it is known that beneficiaries have missions and action tied to reversing climate change; thus, presently such opportunities abound. Some of many examples include actions such as planting trees, teaching farmers how to farm sustainably, installing a recycling center, being the CFO for a wind farm which has no CFO, etc. Thus, via the platform, opportunities reflecting those previously described are uploaded digitally to the platform by users that are requesting the work be done via any of their devices. As well, via the platform, users who are searching in a streamlined and targeted way for opportunities, to which their inputted skillset match and which satisfy the requirement of helping to save the planet in terms of climate change, may find such opportunity and register for such opportunity in real-time via the volunteer user interface of the platform.

In an embodiment, organizations may register as member users of the platform, and, by using the platform, may digitally purchase volunteer packages and subsequently digitally offer such purchases to their customers, employees, friends, partners, and suppliers. Such offerings may be formatted as benefits, educational opportunities, gifts, incentives, loyalty rewards, teambuilding, event recognitions, and/or rewards. In an embodiment, the innovative currency may encompass the previously described formats. Each type of offering may be assigned a data processing type and a measurable and computable value. In an embodiment, the platform is configured to enable consumers to purchase such offerings in the form of gift cards, and gift them to others, regardless of whether or not these others are member users of the platform.

In an embodiment, the platform accepts, manages, and tracks all of the money flowing through it. This includes:
  a. Subscription fees paid by consumers and organizational clients
  b. Item listing fees paid by organizational clients for each product and service they list on the platform
  c. Markup fees changed by the innovative platform (e.g., Planet Cents) on each of the seller's goods and services—this is in terms of a percentage of the total selling price
  d. Channel Partner revenue—these are commissions innovative platform gets from non-sustainable Channel Partners for referring clients to them. For instance, innovative platform refers an organizational client to an employee benefit consulting firm, so that they can help that organization implement and communicate using innovative platform's marketplace as an employee benefit.
  e. Outgoing commissions innovative platform pays Channel Partners for them referring their clients to innovative platform. For instance, a customer loyalty and reward company could refer their clients to innovative platform, and innovative platform pays them a commission for doing this.
  f. Advertising fees In an embodiment, the platform is configured such that in addition to the volunteers going into non-profit organizations, they may also go into for-profit startups, e.g., having activities related to reversing climate change. Further, in addition to providing volunteers from Client organizations, the platform, through other partners, in the employment, staffing, and HRO and RPO realm, is configured also to offer interns to the platform's Clients and Beneficiaries which are doing something to reverse climate change.

In an embodiment, the platform is configured so that the volunteering portal contains a processor and memory for a rating system, where volunteers and interns may rate their experiences at Beneficiaries and Clients. Additionally, Beneficiaries and Clients may do this same. The platform may be configured to carefully monitor and determine, e.g., via predetermined rules and/or algorithms, what is reported publicly. Further, the platform is configured to aggregate and track data so as to make improvements to the system.

In an embodiment, the platform is configured with a rating mechanism for the online market, where people may input product and service reviews. In an embodiment, the platform is configured with a rating mechanism for its portals, e.g., for the benefit of the partners, customers, and client organizations there. The algorithms are configured to process the ratings with the platform's vetting criteria and certifications, which are taken into account in ranking status in the marketplace, fees, etc.

In an embodiment, clients may also purchase products and services from the platform's function-, issue-, and product- and service-based partners via the hub's marketplace and university components. Such components may also be referred to as the Planet Cents Central™ and Planet Cents University™.

In an embodiment, consumers may also make a purchase with the innovative intangible currency, as described herein, for paying for things. For example, $14USD may be referred to as Planet Cents™ of $14USD.

Partners via partner devices: In an embodiment, the innovative platform's may include function-, issue-, product- and service-based businesses in the consumer/customer loyalty, employee benefit, employee and customer engagement, employment, environmental education, environmental product and service, giving, recognition, media, technology, and volunteer management spaces.

In an embodiment, such companies may embed, via the platform's APIs, into their model and legacy systems. Through their customized and embedded code, the platform enables partners to offer accessible, via the hub, packages to their clients, and their customers, employees, partners, and suppliers. Thus, through their devices accessing the hub, such partners' clients may purchase the volunteer engagements, products, and services at the hub (e.g., Planet Cents™). Additionally, the platform is configured to fold or incorporate their offerings into the larger, overarching model and accessible offerings. That is, the hub is configured to present their offerings to other clients or member users, e.g., to access to their services. Thus, the platform enables a mutually-beneficial transactional relationship.

In an embodiment, some partners may be volunteer matching organizations which have legacy systems that may handle the management, recruiting, and tracking of volunteers. Education partners' products and services may be integrated with the platform's university/educational component. The media partners may integrate their legacy systems with the platform's own advertising arm or component, as well as being available and accessible to our clients and their devices, and their partners and suppliers (and their devices), as well as for the platform's member partners, and member suppliers. It should be appreciated that the platform creates and provides the APIs suitable for achieving the integrations described above.

Beneficiaries via their devices: These are the non-profits and no- or low-income startups described above. In an embodiment, the platform is configured to enable the beneficiary, via the beneficiary interface, to receive or accept volunteer's requests, donor inquiries, as well as being able to purchase products/services from the platform's marketplace and university, e.g., at a discounted rate.

Exemplary Embodiments

An embodiment can be understood with reference to FIG. 1, a schematic diagram of a high-level architecture of the network environment. Users to the innovation may access the platform 102 via individual devices 106, organizational devices 104, or devices of customers, employees, partners and suppliers of those organizations and the same entities in their respective networks—into infinity. Examples of such devices (104, 106, and 110) may be personal computers, smartphones, tablets, smart watches, and the like. Device 110 is described in further detail below.

In an embodiment, platform 102 comprises four processors: a processor configured for computing measurable actions taken on sustainability, including vetting, criteria, certification, impact measurement, rating and badge program 108; a processor configured to monitor that each recipient of intangible currency shares and/or markets platform's solutions to those in their networks (e.g., 110), including when those in turn offer them to their networks into infinity 114; a processor configured to allow organizations (e.g., 104) to offer platform's products and services to customers, employees, partners and/or suppliers 110 in the form of benefits, gifts, incentives, recognition, rewards, and/or engagement, team building and/or training tools, e.g., intangible currency 116; and a processor configured to generate. monitor, and update purchasing and money or offering flow 118. It should be appreciated that each processor may itself comprise one or more processors, e.g., to accommodate more computer processing power. Further, each processor is described in more detail below.

In an embodiment, processor 108 receives information on the company's and products and services sustainability, evidence of an unprecedented array of certifications, ratings, rankings, etc. (e.g.: B Corp. certification, organic, information on their achievement of the UN's Sustainable Development Goals, (SDG's,) etc.) for example from external sources of data 120.

Processor 108 receives expansive data in the area of hundreds of sustainability certifications, ratings, ratings and vetting sources, etc. Presently, though some marketplaces have a handful of 1-5 vetting criteria like vegan, Fair Trade, CSR-certified, anti-trafficking, none have hundreds, including global certifications. As compared to the aforementioned criteria, some of the over a hundred and fifty which the innovation includes are: CarbonFree Certified, Carbon Neutral Certification, Climate Registered, Cradle to Cradle Certified, Energy Star, Green Seal, Upcycled Certification, Water Sense Certification, Ecocert, ECOLOGO, Global Green Tag Certified, Green Globe Certification, and more.

Processor 108 receives sustainability information so that it can be calculated into the sustainability ranking and badge program. This includes platform receiving information to be used as an assessment of the percentage of a company's sustainable versus non-sustainable products, which the platform will factor into its ranking system. As an example, a large cereal company has several sustainable brands, but the majority of all of their company's products are not environmentally-friendly, they would be ranked lower down than a small sustainable marketplace whose only products are sustainable, and they possess more sustainable certifications than the cereal company. The more sustainable companies are listed towards the top. It should be appreciated that the algorithms of the platform are complex, robust, and extensive in their technical capacities, design, and customization.

On the consumer and organizational side, both enter referral information into the referral system, (e.g.: including the names, titles, addresses, emails, phone, etc.) when they would like to refer other consumers and organizations onto the platform.

Processor 108 processes the most and least popular vetting criteria, who the vetting partners are in each vetting category and what the amount of organizational clients we are sending to them, all channel partner activity—whose products and services we are selling and to whom. The packaging, shipping, and other related sustainable supply-chain partners data are processed, measured and tracked in real-time within the cloud platform.

The platform's algorithms measure, and track all sustainability information so that it can calculates it into the innovation's sustainability ranking and badge program. This includes platform receiving information to be used as an assessment of the percentage of a company's sustainable versus non-sustainable products, which the algorithms will factor into its ranking system. The more sustainable companies are listed towards the top.

The algorithms receive the input parameters from above, calculates the items sold, at what price, how many were listed as compared to those sold, how sustainable an organization is and as compared to other organizations and products and services on the site, the additional certifications, rankings, etc. as they achieve more in the sustainability categories on the site, where products were packaged, shipped, and when, concerns issues related to the company, etc. This, along with the vetting criteria and achievements are processed to yield information in the Impact Tracker display.

On the consumer and organizational side, the algorithms marry all referral data with the badge program.

Processor 108's algorithms release aggregates of the most and least popular vetting criteria, the kinds of companies achieving it, the highest achievers, badge escalation by both consumers and organizational clients, trends as well as data on impact of all buying on the site. This is translated and configured into the monthly impact of all purchases made at the innovative platform in terms of environmental impact. Marrying this with the extensive vetting criteria built into the algorithm, this provides detail for each product and service category as well as each vetting category. For instance, during a month X amount of apparel was sold, and based on impact measurement figures built in, the site's Impact Tracker shows how much water was saved and how many toxic chemicals did not pollute our planet and people's health. Given that the textile industry uses a huge amount of water and releases toxins into the environment, this is quite significant. The same concept applies to other product categories and industries, so detailed information on this provides companies with a blueprint for change.

Another example is X amount of energy-efficient products are sold, the amount of which is calculated by marrying it with statistics on energy efficiency, thereby yielding an aggregate number for how much energy was saved during the month, to be displayed on the Impact Tracker. It should be appreciated that no existing marketplace exists with both depth and breadth of vetting categories, and the way in which the algorithm marries this with known impact measurements and impact averages for each category, producing measurable and meaningful numbers for both consumers and organizations alike.

The processed referral information is translated into badge recognition system, and produces more consumers, organizational clients and selling partners.

Digital and online notifications as well as robust reports on sustainability and impact measurement of and for the partners, the public, media, and other interested parties. The innovation calculates the progress, elevates the badge level of sellers, and announces victories in high achievers. Such notifications and reports on the above go to need-to-know parties.

In an embodiment processor 114 represents intangible currency. Such is not an actual form of currency, but a brand name referring to transactions occurring on the site, e.g., platform 102, which involve money, e.g., selling prices of items, purchasing value of gift/loyalty cards, amounts that happen between the innovative platform and its partners, etc. The amounts are in the actual currency of the country, e.g., $20 in yen, pesos, euros, or any other currency, would be $20 in USD. In an embodiment, the data input parameters to processor 114 include information required to translate a country's currency into what it would be in USD, and vice versa. Data processed by processor 114 includes the information input parameters from above, the amount of revenue of interested parties, e.g., to/from the innovative platform and each other. The data output and to where are to those involved in selling and purchasing at the innovative platform.

In an embodiment, processor 116 is configured to allow organizations (e.g., 104) to offer platform's products and services to customers, employees, partners and/or suppliers 110 in the form of benefits, gifts, incentives, recognition, rewards, and/or engagement, team building and/or training tools, e.g., intangible currency. That is, processor 116 is processes the organizational client offerings/usage in the form of benefits, gifts, incentives, recognition, rewards, and/or engagement, team building and/or training tools, e.g., intangible currency.

In an embodiment, processor 116 receives data from organizational clients (e.g., 104).

Processor 116 receives organization-specific electronic information. This includes traditional data, e.g., name, address, dates, items such as number and type, category. This also includes detailed information on the company's existing programs in these areas, e.g., types, names, usage, their partners and what each does, how they are used and not used and why, who the programs serve, the current results, what programs they do not have and why, how they want and are using the innovative platform, whether some or all programs/uses and how, etc.

This includes the platform receiving which uses they are employing using the platform and with whom and how many of them, (e.g., customers, employees, partners, suppliers, etc.), how the programs are working and not working, opportunities to increase the company's usage in areas where they are not using, etc.

Processor 116 measures, tracks, and processes the information above, including program, those served, and usage additions, etc.

Processor 116 produces digital notifications and reports on the above, as well as successes relative to the innovation's impact goals, as well as positive results at the companies as a result of their involvement with the innovative platform.

In an embodiment, processor 118 is configured to generate. monitor, and update purchasing and money or offering flow. In this embodiment, the offerings, purchasing, and money flow includes:
  a. From organizational Clients to the innovative platform (e.g., Planet Cents) and vice versa;
  b. From Channel Partners to the innovative platform and vice versa;
  c. From Consumers to the innovative platform;
  d. From organizational Clients to their customers, donors, employees, partners, suppliers and volunteers to the innovative platform; and
  e. From an organizational Clients' customers, donors, employees, partners and suppliers to the innovative platform.

Figure 2:
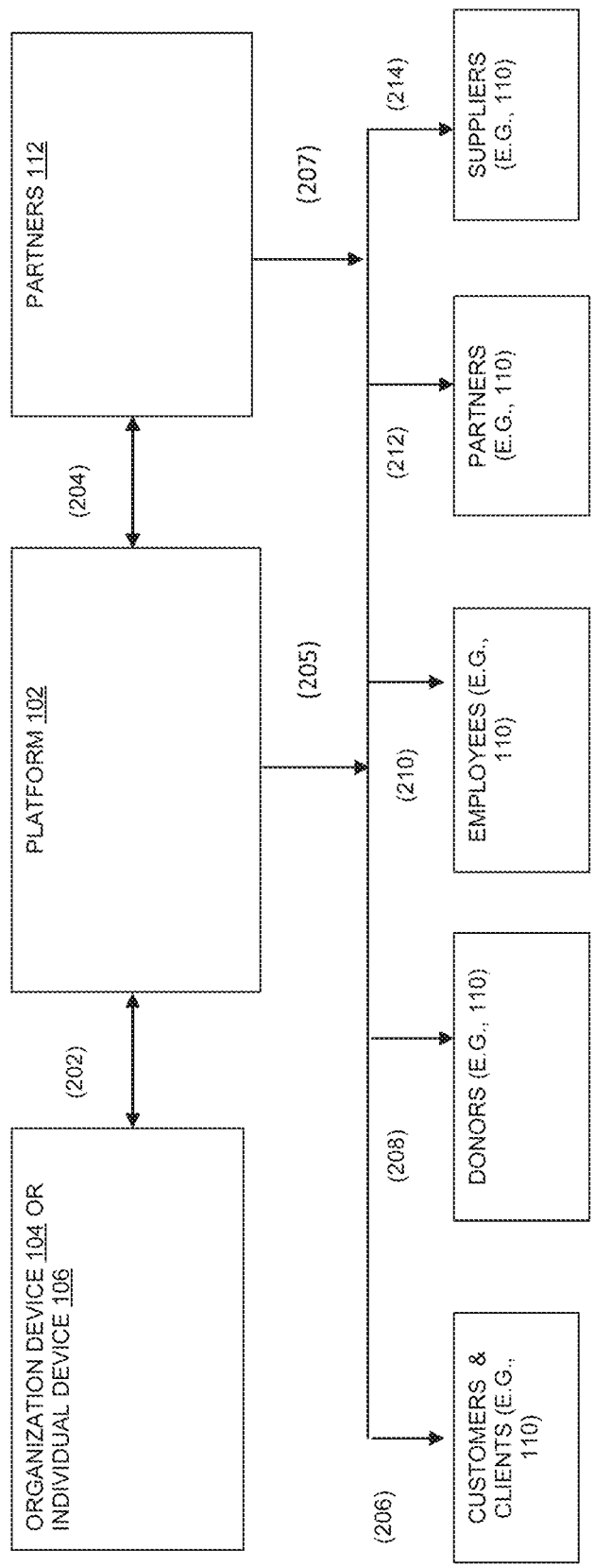
FIG. 2 is a schematic diagram showing interactions between components, in accordance with an embodiment.

Further details are also found in the description of FIG. 2.

In an embodiment, devices 110 are configured to be the devices of customers, employees, partners and suppliers of those organizations and the same entities in their respective networks—into infinity or so on.

Platform 102 receives from devices 110 device-specific electronic informational parameters, input into the platform by the parties above. This includes both traditional data, (e.g., name, address, dates, items such as number and type, category,) if they want to do their own packaging and shipping or utilize our packaging and shipping partners, as well as expansive data in the area of hundreds of sustainability certifications, ratings, ratings and vetting sources, etc.

Platform 102 receives from devices 110 the information related to the relationships between the parties and of the specifics related to those relationships which are pertinent to their involvement with innovative platform. This includes contracts, their nature, between whom, which usages, (e.g., gifts, employee benefit, employee, customer, partner and supplier incentive, recognition, reward, engagement and teambuilding,) organizations employ, and with whom, (e.g., customer, employee, partner and supplier, etc.) These informational parameters may be input by the parties above (e.g., devices 110), as well as the platform. It should be appreciated that there is no other marketplace platform which has these usages.

Platform 102 receives from devices 110 the information on their items to be sold, (e.g., names, types, categories, number of items, selling prices, discounts, sales, etc.) The platform 102 may also receive information on the company's and products and services sustainability, evidence of certifications, ratings, rankings, etc. (e.g.: B Corp. certification, organic, information on their achievement of the UN's Sustainable Development Goals, (SDG's,) etc. for example from external sources of data 120.

Platform 102 receives the sustainability information so that it can be calculated into the innovation's sustainability ranking and badge program. This includes platform receiving information used as an assessment of the percentage of a company's sustainable versus non-sustainable products, which the platform will factor into its ranking system. For example, the more sustainable companies are listed towards the top.

Based on the input parameters from devices 110, the above information is processed, in addition to the traditional eCommerce marketplaces (e.g., which seller listed what items, how many, how many sold and at what prices they were listed, discounted, and sold, dates and times of sales, profit to the seller and to Planet Cents, returns, problems, shipping and packaging.) In an embodiment, the sellers may do their own with the exception of sellers who want the help of the platform's shipping and packaging partners, the activities between all parties, and the standard eCommerce marketplace information which comes with it, etc., most and least popular vetting criteria, who the vetting partners are in each vetting category and what amount of organizational clients the platform is sending to them, all channel partner activity, whose products and services the platform is selling and to whom. All packaging, shipping, and other related supply-chain partners, (all sustainable,) data is processed, measured and tracked in real-time within the cloud platform. It should be appreciated that since the innovation requires very few warehouses around the world, due to the facilitation of this process.

The platform's proprietary algorithms calculate usage trends and results for each customer, employee, partner, and supplier, as well as aggregate trends and results.

The platform algorithms measure and track the sustainability information so that they can calculate it into the platform's sustainability ranking and badge program and its pioneering Impact Tracker. This includes the platform receiving information to be used as an assessment of the percentage of a company's sustainable versus non-sustainable products, which the platform will factor into its ranking system. The more sustainable companies will be listed towards the top.

Based in part on input parameters from devices 110, platform 102 processes the informational input parameters from above, calculating all items sold, at what price, how many were listed as compared to those sold, how sustainable an organization is and as compared to other organizations and products and services on the site, the additional certifications, rankings, etc. as they achieve more in the innovation's sustainability categories on the site, where products were packaged, shipped, and when, concerns issues related to the company, etc.

Based in part on input parameters from devices 110, significantly and as a result of employing the innovative platform 102's offerings as an employee benefit, or a customer, partner, and/or supplier incentive, recognition, reward, engagement or teambuilding tool, organizations will attract and retain customers, employees, investors, partners and suppliers. This is huge, since they are currently losing them due to inaction on climate change. This in turn improves their reputation and revenue.

Output may include digital notifications and reports measuring every aspect and elements of the relationships of companies, their customers, employees, partners, and suppliers relative to their involvement with the platform 102. Reports measuring every aspect of the platform's activities, functionality, performance, measurements, tracking, etc. This includes private partner and entities, as well as the public, depending on the kind of data.

Outputs further include digital notifications and reports to the channel, selling, vetting, and technology, and other partners, (e.g., how many items sold, to whom, which ones, at what prices they were listed, discounted, and sold, dates and times of sales, profit to the seller and to the innovative platform operational entity, returns, problems, shipping and packaging, etc.)

Outputs further include digital notifications and robust reports on sustainability and impact measurement of and for the partners, the public, media, and other interested parties (e.g.: progress, elevate the badge level of sellers, and announce victories in high achievers.)

It should be appreciated that the innovative platform may provide digital notifications and reports on the above to the need-to-know parties.

In an embodiment, partners 112 are selling partners, almost all are sustainable, with the exception of non-sustainable channel partners such as a benefit, customer loyalty, HRO, etc. company. Such are partners in that they help the organizational clients implement the innovation's solution.

It should be appreciated that partner organizations can be clients of the innovative platform, also.

Consistent with embodiments herein, following are kinds of partners 112:

1. selling partners, (organizations with sustainable products and/or services)—one-way revenue flow—them to the innovative platform 102
   a. sustainable—bamboo toilet paper, green landscaping services, energy-efficient appliances, green architects, etc.
2. channel partners, (products and/or services) —two-way revenue flow—them to the platform and the platform to them
   a. sustainable—CSR consultants, software, etc.
   b. non-sustainable—e.g.: benefit, customer loyalty, HRO, etc. companies
3. sustainable marketplaces, (products and services, though a negligent amount offer services,) (both B2C and B2B, though the latter is miniscule, which puts the platform in front of every B2B marketplace) since the majority of marketplaces are B2C with a very narrow scope of product categories, (e.g.: apparel, artisan crafts, food, home, jewelry,) and since the innovative marketplace (e.g., platform 102) may have thousands of categories across an expansive range of categories and industries, the platform is contemplated to have the capability and customization required to handle the robust nature of the data input parameters, processing, tracking, measurement, and reporting.

For input parameters, the platform 102 receives seller-specific electronic information, input into the platform by sellers, using the seller-specific account portal on the cloud. This includes both traditional data, (e.g., name, address, dates, items such as number and type, category,) if they want to do their own packaging and shipping or utilize the platform's packaging and shipping partners, as well as expansive data in the area of hundreds of sustainability certifications, ratings, ratings and vetting sources, etc. The platform 102 receives the standard data like name of company, name of contact at the company, address, phone, etc. The platform receives the information on their items to be sold, (e.g., names, types, categories, number of items, selling prices, discounts, sales, etc.) The platform also receives the information on the company's and products and services sustainability, evidence of certifications, ratings, rankings, etc. (e.g.: B Corp. certification, organic, information on their achievement of the UN's Sustainable Development Goals, (SDG's,) etc. for example also from external sources of data 120.

The platform 102 receives the sustainability information so that it can be calculated into the innovative sustainability ranking and badge program. This includes platform receiving information used as an assessment of the percentage of a company's sustainable versus non-sustainable products, which the platform factors into its ranking system. The more sustainable companies will be listed towards the top. Thus, the algorithms of the platform are complex, robust, and extensive in their technical capacities, design, and customization.

Channel partners—both sustainable and non-sustainable may have the platform receive the data as other sellers if they are a seller as well, as well as the traditional data similar to sellers and marketplaces. The platform inputs and stores their data into a data store, (e.g., the nature of the relationship, the parameters of it, the rules of the agreement with the platform, the revenue cut, etc.) the revenue tracking of the two-way flow, product tracking, etc.

Technology partners in the area of sustainability, (CSR and ESG consultants and software products and services) input their data values, embed their impact measurement tracking software, import technology into the platform. If they are a seller as opposed to simply a non-sustainable tech partner, the platform receives the data as other sellers if they are a seller as well, as well as the traditional data similar to sellers and marketplaces.

Vetting partners, (e.g., company, product, and service vetting,) input the following parameters: their criteria, their evidence/verification of the certifications, rankings, and rating. The platform receives and manages this continuously, so that the innovation can track and report progress, elevate the badge level of sellers, and announce victories in high achievers. If they are a seller as opposed to simply a non-sustainable tech partner, the platform receives the data as other sellers if they are a seller as well, as well as the traditional data similar to sellers and marketplaces.

Processing based on input parameters from the partners 112 is as follows. The above informational values, in addition to all traditional eCommerce marketplaces (e.g., which seller listed what items, how many, how many sold and at what prices they were listed, discounted, and sold, dates and times of sales, profit to the seller and to the entity operating the innovative platform, returns, problems, shipping and packaging, (the sellers may do their own with the exception of sellers who want the help of the platform's shipping and packaging partners, the activities between all parties, and the standard eCommerce marketplace information which comes with it,) etc.,) most and least popular vetting criteria, who the vetting partners are in each vetting category and what amount of organizational clients the platform is sending to them, channel partner activity—whose products and services we are selling and to whom. The packaging, shipping, and other related supply-chain partners, (all sustainable,) data is processed, measured and tracked in real-time within the cloud platform.

The platform measures and tracks the sustainability information so that it can calculate it into the innovation's sustainability ranking and badge program. This includes the platform receiving information to be used as an assessment of the percentage of a company's sustainable versus non-sustainable products, which the platform factors into its ranking system. The more sustainable companies will be listed towards the top.

Also processed are the informational input parameters from above, calculating the items sold, at what price, how many were listed as compared to those sold, how sustainable an organization is and as compared to other organizations and products and services on the site, the additional certifications, rankings, etc. as they achieve more in the sustainability categories on the site, where products were packaged, shipped, and when, concerns issues related to the company, etc.

Channel partners—both sustainable and non-sustainable may have the platform process, measure and track their data, (e.g., the nature of the relationship, the parameters of it, the rules of the Agreement with the entity operating the platform, the revenue cut, etc.) the revenue tracking, product tracking, etc. and will produce real-time reports.

Technology partners in the area of sustainability, (CSR and ESG consultants and software products and services) may have the platform process and work in tandem with embedding their impact measurement tracking software, and/or import technology, as well as embed their information processes, tools, etc. into the platform. The platform may take a highly-diverse combination of sustainable impact measurement, and process it so that there is legitimate and specific evidence of actual sustainable impact shown monthly, or even more frequently, displayed in a stock-market-like ticker always visible on the platform.

Vetting partners, (e.g.: company, product, and service vetting,) may input the following parameters: their criteria, their evidence/verification of the certifications, rankings, and rating. The platform may receive and manage this continuously, so that it can track and report progress, elevate the badge level of sellers, and announce victories in high achievers.

Outputs based on partners 112 information may include digital notifications and reports measuring every aspect of the platform's activities, functionality, performance, measurements, tracking, etc. This includes private partner and entities, as well as the public, depending on the kind of data.

Outputs further include digital notifications and reports to channel, selling, vetting, and technology, and other partners, (e.g., how many items sold, to whom, which ones, at what prices they were listed, discounted, and sold, dates and times of sales, profit to the seller and to the entity operating the innovative platform, returns, problems, shipping and packaging, etc.)

Further outputs include digital notifications and robust reports on sustainability and impact measurement of and for the partners, the public, media, and other interested parties. (e.g., progress, elevate the badge level of sellers, and announce victories in high achievers.)

Digital notifications and reports on the above may be to the need-to-know parties.

An embodiment can be understood with reference to FIG. 2, a schematic diagram showing interactions between components.

Step 202 to platform 102: Organizational Clients to the platform—organizations buy products from the platform (revenue to the platform).

From platform 102-202: The platform provides Organizational Clients discounted item listing and subscription fees rewarding them for their sustainability (revenue saved by Organizational Client—not paid to the platform).

Step 204, from platform 102-partners 112: The platform points Organizational Clients who need the products and services of Channel Partners (non-sustainable) to those partners in a non-sustainable partners portal— (the platform earns referral commissions for doing so).

Step 204, from partners 112-platform 102: Channel Partners, (non-sustainable), refer their own clients who would benefit from what the innovation offers, which is in alignment with what they do, (e.g., an employee benefit company, which can introduce the platform's offerings as an employee benefit to their clients (e.g., intangible currency), to the platform. The platform pays the Channel Partner a commission for doing this.

Step 204 from platform 102-partners 112: The platform points Organizational Clients who need the products and services of sustainable Channel Partners to those partners solely as a normal function of its site as they are sustainable sellers No commissions involved; the platform earns revenue from its item listing and markup fees on the prices of those products and services.

Step 204 from partners 112-platform 102: Sustainable Channel Partners refer their own clients who would benefit from what the platform offers to the platform. The platform pays them a referral fee either as a payment or deduction from what they owe the platform.

In an embodiment, but not shown, consumers (e.g., individuals 106) may purchase from the platform.

Step 205 depicting from platform 102 to the solid horizontal line and those connected with it (e.g., 110 and steps 206, 208, 210, 212, and 214) depict the Organizational Clients sharing the platform's offerings as per the platform's usage choices and recipients, (e.g., their customers/clients, employees, partners, and suppliers).

Step 207 depicting from partners 112 to the solid horizontal line and all of those connected with it (e.g., 110 and steps 206, 208, 210, 212, and 214) depict Channel Partners sharing the platform's offerings as per the platform's usage choices and recipients, (e.g., their customers/clients, employees, partners, and suppliers.)

The downward arrows from the solid horizontal line (i.e., steps 206, 208, 210, 212, and 214) signify that in sharing the platform with them, Organizations and Channel Partners have that as an expense in their giving of benefits, gift cards, rewards, recognition, etc.

The Donors box may be having the additions of Members and Volunteers—non-profits can share the platform with their donors, members, and/or volunteers. This would include Channel Partners such as faith-based, activist, union, associations, and others with those constituencies.

Figure 3:
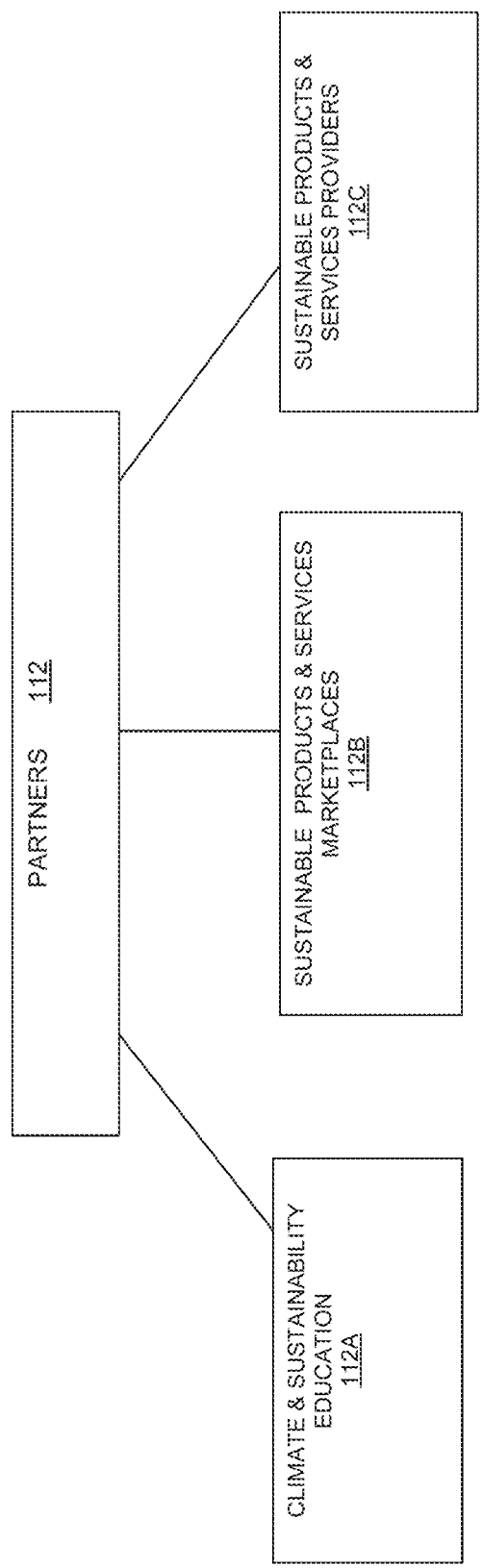
FIG. 3 is a schematic diagram showing example partners, in accordance with an embodiment.

An embodiment can be understood with reference to FIG. 3, a schematic diagram showing example partners.

In an embodiment, the types and disparate range of Channel Partners are not only a significant component to this innovation, but employed by no other marketplace innovation in the market. Though these also include those mentioned below, they span into partners such as activist-, customer-, faith-, HR-, union-based organizations, etc., the bulk fall into these areas:

A—CLIMATE AND SUSTAINABILITY EDUCATION—This area is pertinent to the innovation given that people and organizations first need education to take action. Education includes classroom to outdoor experiential and everything in between. Examples of these Partners include large educational institutions such as Stanford University, down to grassroots environmental organizations such as the Sierra Club. No other marketplace platform offers this.

B—SUSTAINABLE PRODUCTS AND SERVICES MARKETPLACES—This area is pertinent to the innovation given that no other marketplace platform has other sustainable marketplaces within it. This allows B2C marketplaces to protect themselves from large enterprises putting them out of business, but allows them access to the B2B market. This establishes this innovation as a pioneer in uniting all in revering climate change.

C—SUSTAINABLE PRODUCTS AND SERVICES PROVIDERS—This area is pertinent to the innovation in that it is the overarching umbrella over all partners, given that both selling partners, (selling organizations and marketplaces,) and/or channel partners offer products and services.

In summary, there is no other equivalent to the breadth and depth of this market-disrupting innovation. Even the largest known enterprises do not come close in its platforms range of:
1. Lack of breath or depth of sustainable product—and NO sustainable services
2. No B2B focus, or B2B2C model with this innovation's marketplace uses
3. No warehouses all over the world
4. No inclusion of other marketplaces keeping the majority of control
5. No such range and diversity of Channel Partners.

As mentioned above, the data input values include the platform receiving the standard data values such as name of company, name of contact at the company, address, phone, etc. The platform receives information on their items to be sold, (e.g., names, types, categories, number of items, selling prices, discounts, sales, etc.). The platform also receives informational input values on the company's and products and services sustainability, evidence of certifications, ratings, rankings, etc. (e.g.: B Corp. certification, organic, information on their achievement of the UN's Sustainable Development Goals, (SDG's,) etc.

As mentioned above, data processing includes: receiving the informational data input values from above, and calculating the items sold, at what price, how many were listed as compared to those sold, how sustainable an organization is and as compared to other organizations and products and services on the site, the additional certifications, rankings, etc. as they achieve more in the platform's sustainability categories on the site, where products were packaged, shipped, and when, concerns issues related to the company, etc.

As mentioned above, data output includes: Digital notifications and reports on the above to the need-to-know parties.

Figure 4:
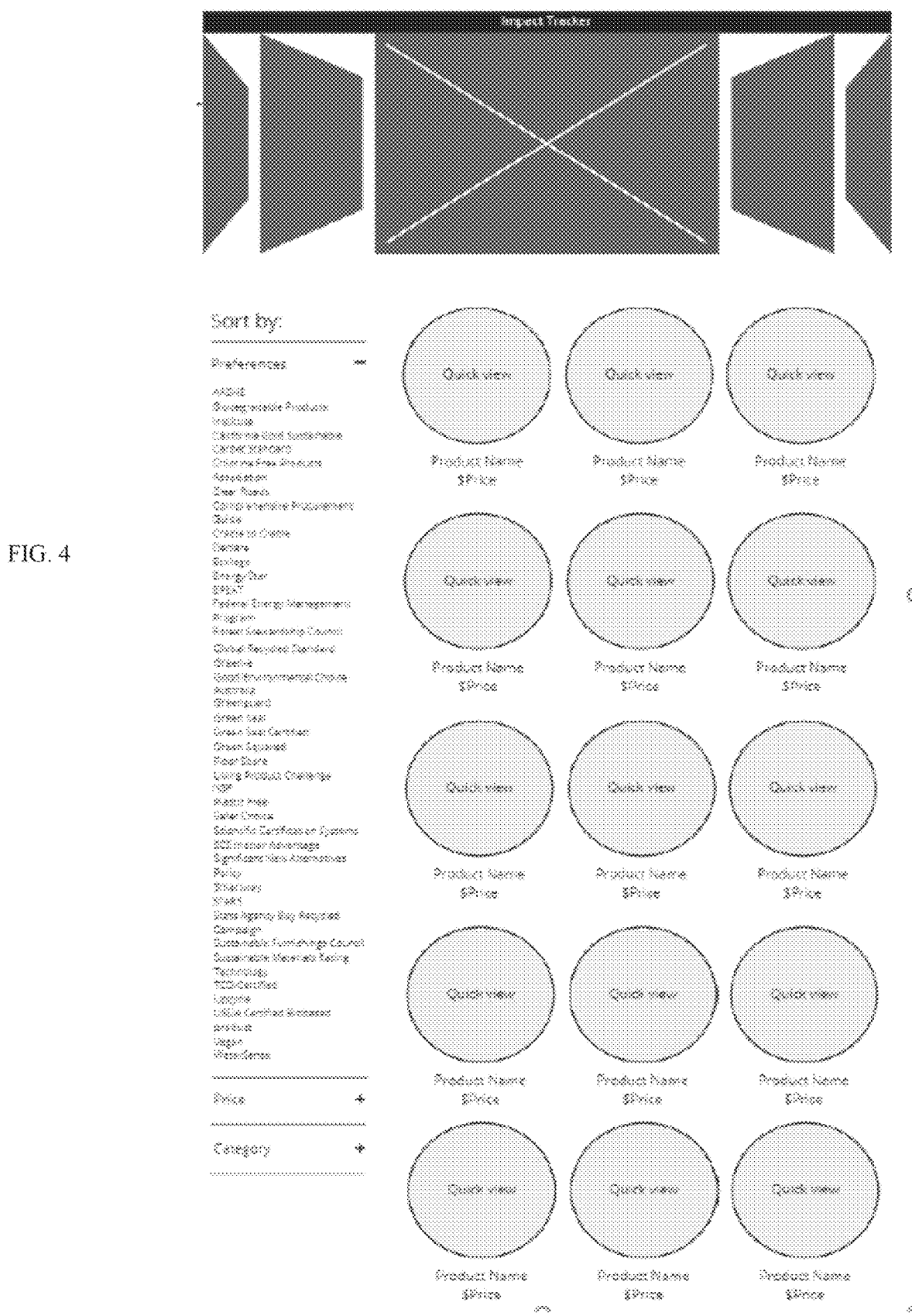
FIG. 4 is a sample screenshot of an impact tracker page for products, in accordance with an embodiment.
Figure 5:
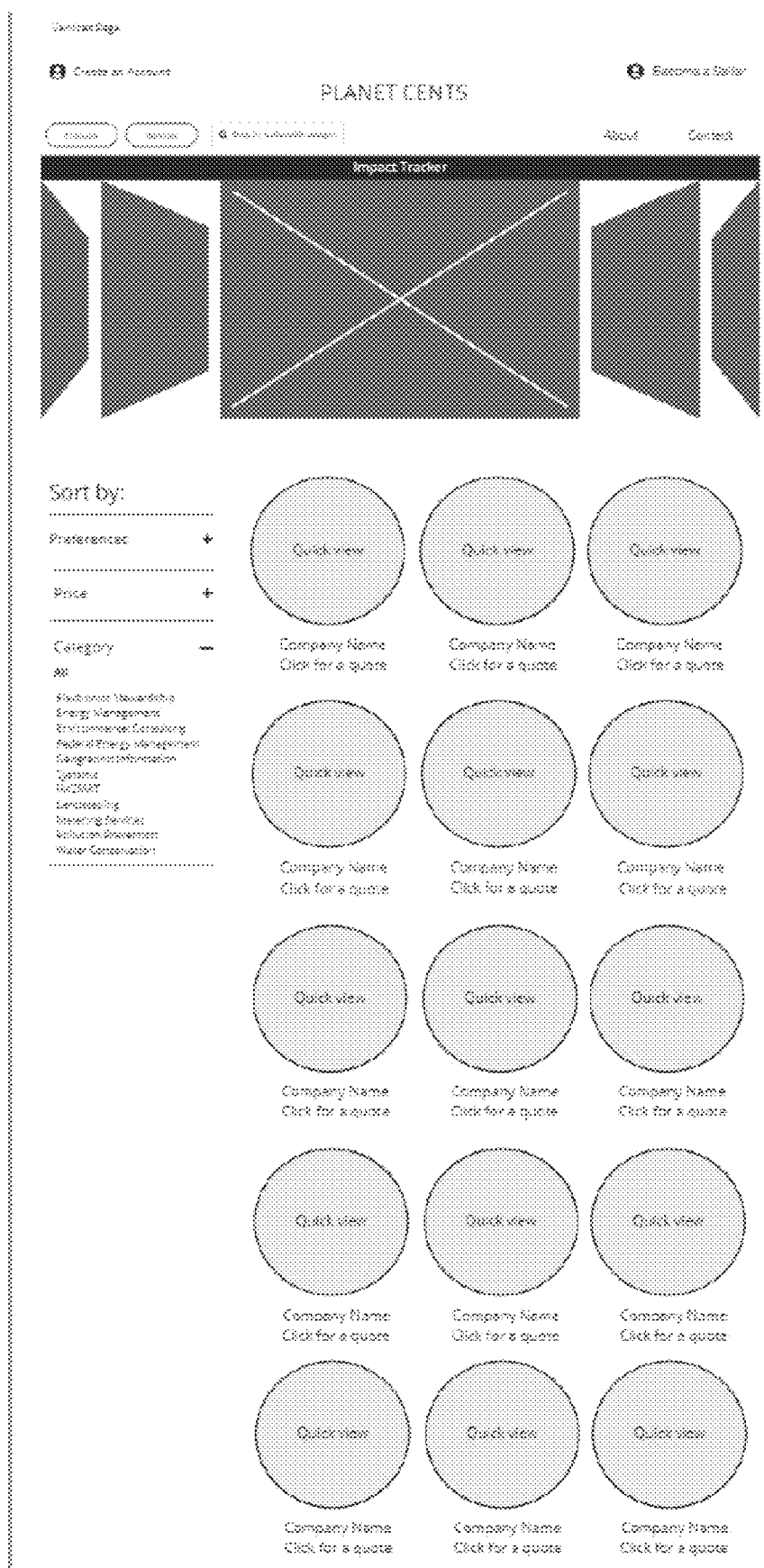
FIG. 5 is a sample screenshot of an impact tracker page for services, in accordance with an embodiment.
Figure 7:
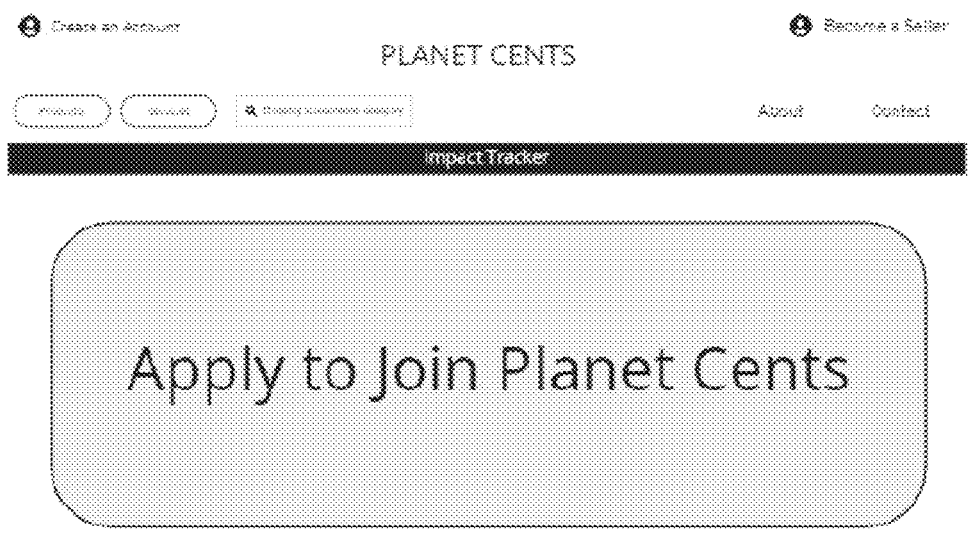
FIG. 7 is a sample screenshot of a details input page, in accordance with an embodiment.
Figure 8:
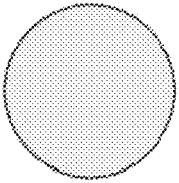
FIG. 8 is a sample screenshot of an orders page, in accordance with an embodiment.
Figure 9:
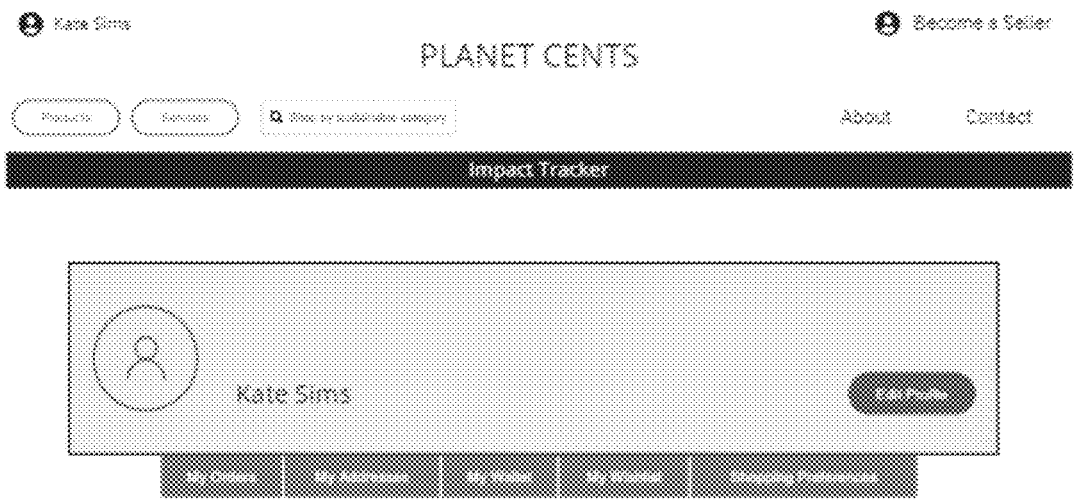
FIG. 9 is a sample screenshot of a wallet page, in accordance with an embodiment.
Figure 17:
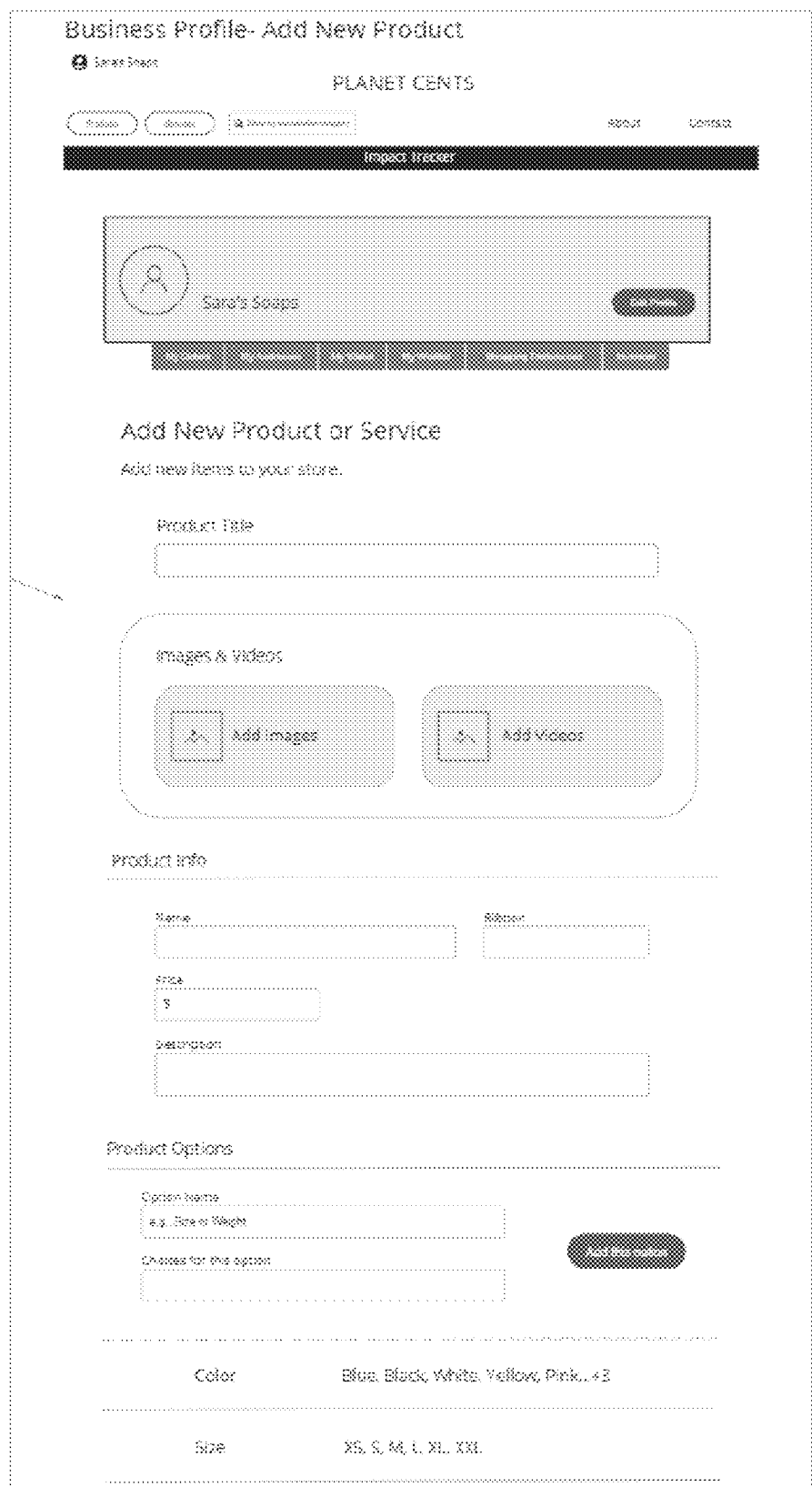
FIG. 17 is a sample screenshot of an add new product page for a business, in accordance with an embodiment.

An embodiment can be understood with reference to FIGS. 4-17, sample screen shots of user interfaces to the innovative platform. FIG. 4 is a sample screenshot of an impact tracker page for products. Users can sort by sustainable preferences and can drill down into a quick view of each product. They can also sort by price or category. FIG. 5 is a sample screenshot of an impact tracker page for services, where users can sort by sustainable preferences, price and category. Users can also drill down to a quick view of the service. FIG. 6 is a sample screenshot of an information and application page. Users can read up on basic, standard, or advanced packages and well as the platform's vetting process. FIG. 7 is a sample screenshot of a details input values page for joining the innovative platform. FIG. 8 is a sample screenshot of a customer's orders page. Users can view the status of orders or browse through past purchases. FIG. 9 is a sample screenshot of the customer's wallet page. For example, a customer can save his or her credit or debit card information. FIG. 10 is a sample screenshot of a customer wish list page. The customer can view favorite products that were saved to the wish list. FIG. 11 is a sample screenshot of a customer's sustainable preferences list page. The customer can search for and save the type of sustainability that the customer prefers to shop by. FIG. 12 is a sample screenshot of a business orders page. A business (e.g., here meaning a person representing the business), that can also use the platform, can check the status of orders or browse through past purchases. FIG. 13 is a sample screenshot of a business wallets page. The business can also save their credit or debit card details for faster checkout. FIG. 14 is a sample screenshot of a business wish list page. The business can view favorite products saved to the wish list. FIG. 15 is a sample screenshot of a business sustainable preferences page. The business can search for and save the type of sustainability by which the business itself prefers to shop. FIG. 16 is a sample screenshot of a business inventory page. This screenshot shows how a business can manage its store's inventory. This page also allows a business to add a product or service to its inventory. FIG. 17 is a sample screenshot of an add new product page for a business. Here, details about the new product or service can be entered by the business as well as images or videos can be uploaded to the platform.

Other Exemplary Embodiments

It should be appreciated that one of the overarching aspects of this innovation is its B2B2C feature whereby organizational Clients offer a marketplace as an employee, customer, partner and supplier. This coupled with a marketplace being used as an employee benefit, and customer, employee, partner and supplier gift, incentive, engagement, recognition and reward is unprecedented and highly-disruptive in the existing market.

An embodiment of the innovative platform is described as follows.

On the Volunteering part of the model and configured portal of the hub:

1. Clients purchase the volunteer packages.
   a. They offer such packages to their clients/customers in the form of a gift card, e.g., in magnetic plastic form or digitally via a programmed barcode, branded as Planet Cents™.
   b. They offer them to their employees as benefits, educational opportunities, giving, incentives, loyalty rewards, teambuilding, event recognitions, and/or rewards.
   c. They offer them to their partners as educational opportunities, gifts, incentives, loyalty rewards, teambuilding, event recognitions, and/or rewards.
   d. They offer them to their suppliers as benefits, educational opportunities, gifts, incentives, loyalty rewards, teambuilding, event recognitions, and/or rewards.
2. Clients/customers of the platform's clients (named above) can then offer them to their customers, employees, partners, and suppliers. This pattern continues downward into infinity, where each recipient can gift the package to their friends, customers, partners, and suppliers. And then, those recipients can then gift them to their friends, customers, partners, and suppliers, and so on.
3. Employees of the above-named clients can purchase these for their friends. If these employees have a business or side gig, they can then offer them to their customers, employees, partners, and suppliers. This pattern continues downward into infinity, where each recipient may gift them to their friends, customers, partners, and suppliers. And then, those recipients can then gift them to their friends, customers, partners, and suppliers, and so on.
4. Partners of our Clients (named above) may then offer them to their customers, employees, partners, and suppliers. This pattern continues downward into infinity, where each recipient can gift them to their friends, customers, partners, and suppliers. And then, those recipients can then gift them to their friends, customers, partners, and suppliers, and so on.
5. Suppliers of our Clients (named above) can then offer them to their customers, employees, partners, and suppliers. This pattern continues downward into infinity, where each recipient can gift them to their friends, customers, partners, and suppliers. And then, those recipients can then gift them to their friends, customers, partners, and suppliers, and so on.

In an embodiment, the platform is configured to enable leasing, renting, swapping, and selling by the platform's participants.

In an embodiment, these offerings are transacted via the platform, where each party's functionalities (e.g., accepting an offer and making the offer to another) may be performed from their own device, via the appropriate portal (e.g., client, volunteer, beneficiary), by way of a communications network. Examples of such network may be a generic communication system. In one embodiment, the communication network comprises the Internet. Interfaces to the network may be a modem or other type of Internet communication device. Alternatively, the communication network may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. In such embodiments, interfaces are configured to establish a communication link or the like with the communication network on an as-needed basis, and are configured to communicate over the particular type of communication network to which it is coupled.

It should be appreciated that the above activities create revenue for the enterprise executing the platform and/or enact fees on the prices of products and services.

In the platform's marketplace part of the model and configuration, the following applies.

Those individuals and organizations involved with the platform/hub may purchase products and services. Non-profit and pre-revenue startup beneficiaries may get special discounts. For others, discounts may be graded based on the price of the order purchased, offering greater discounts for higher-priced orders. Additionally, the hub's partners may get special discounts, depending on the value of their contribution to the platform and its underlying model.

The platform's university may be part of the marketplace in the services category.

In an embodiment, an enterprise executing the platform may take a percentage of the sales in its marketplace. It may also be part of one perfect for the planet, giving at least one percent or more in donations. Additionally, once the climate change aspect of the hub (e.g., Planet Cents™) is humming or operating primarily without hitches, an embodiment may include either a non-profit spinoff or subsidiary, focused on poverty and homelessness. Alternatively, in an embodiment, the non-profit spinoff or subsidiary, focused on poverty and homelessness, is integrated into the existing Planet Cents platform and model, described above.

It should be appreciated that, presently, there is no company, organization, or enterprise, that has or teaches such a mechanism or combined technique of the innovative platform, which is described in detail in various embodiments herein.

In an embodiment, Planet Cents™ is a marketplace of marketplaces and companies, including existing sustainable marketplaces into it, but also companies wishing to sell their products and services. This, along with the unique multi-portal, multi-partner, and expansive array of products and services, is a market-disrupting and defining feature.

In an embodiment, no other organization has both a B2B2C and B2C model. Planet Cents™ is a Business selling to Consumers, (B2C,) and a Business selling to Businesses, (B2B) combination. In an embodiment, no other B2C marketplace has a very expansive focus as far as products—thousands of products and services categories. They have predominantly food, personal care products, clothing, jewelry, artisan crafts.

In an embodiment, only a very tiny fraction of other B2B marketplaces/clearinghouses acts as a buying and selling marketplace, but instead, are guides, list of companies and products, pointing to company websites. The minute few that are actual marketplaces, do not have the unique combined attributes as Planet Cents™.

In an embodiment, no other organization offers businesses an opportunity to use their marketplace as gifts, benefits, incentives, recognition, and rewards for their customers, employees, partners and/or suppliers.

In an embodiment, no other marketplace platform has the extremely-long list of sustainable vetting categories as Planet Cents™. This innovation not only includes traditional vetting for any eCommerce site, like product, service, fake review, counterfeit vetting, but those specific to sustainability and its related categories. The platform's proprietary technology and algorithms allow customers to customize their purchasing profile to meet their values and desires, as well as match them with the products and services in those categories.

*B Corp, Organic, Cruelty-free, Fair Trade, GMO Project Verified, LEED-certified, Forest Sustainability Council certified, water-saver, energy-efficient, anti-trafficking, gluten-free, wild caught, child-labor free, etc.,) as well as non-certification categories like company transparency, reputation, and target performance goals achieved, etc. This would also include incorporation of the UN's 17 Sustainable Development Goals (SDG's.)

In addition to the vetting of products and services, unlike any other organization, Planet Cents™ has partners who conduct vetting of companies—their behaviors, reputation, etc. This vetting may also be factored into an earned-badge displayed by each company's name, derived from its aggregate certifications, ratings, etc. This badge system, (e.g. badges showing how sustainable a company is based on the aggregated data,) may also determine in what order a company's products are displayed on the platform. A company's level of sustainability may also be factored into the fees it pays.

In an embodiment, unlike other organizations Planet Cents™ has a badge system which incentivizes shoppers, (whether consumers, sellers, and/or organizational buyers,) to refer others to the platform, as well as on their buying behaviors, longevity, etc. This is not based on consumption, but rather on things like achieving a balance across a range of shopping categories. In other words, shifting the majority of their consumption in all areas of their lives and workplaces to sustainable consumption and purchasing.

In an embodiment, unlike other organizations Planet Cents™ is predominantly virtual, international, and have very few warehouses, as all of the selling partners may package and drop-ship from their locations. Should they wish not to do this, Planet Cents™ offers sustainable packaging and shipping services to them.

In an embodiment, volunteer matching organizations may be volunteer partners in the volunteer hub of the Planet Cents™ platform and model. Thus, they may perform the volunteering function that they do currently, by integrating their system capabilities with the platform by using the platform's APIs. In an embodiment, those volunteer matching organizations, that may have a robust technology platform, may integrate the following functionality to the innovative platform: to house, manage, and track all company activities, among its many partner organizations. In doing so, such volunteer matching organization may be both a volunteer and technology partner. In an embodiment, the same may be said for other non-volunteer matching partners, of the set of the platform's other partners, which may have the ability to do this, e.g., a giving and fundraising platform or CSR/ESG platform partners.

It should be appreciated that no other organization has a primary focus on climate-change-related environmental beneficiary/host organizations, doing things known to reverse climate change, and tied with a marketplace and university. This is a primary focus area of the innovative platform.

Some companies may be focused in the area of an organization's employees, and do not include a client organizations' customers, partners, and suppliers. In contrast, the platform is configured to target and incorporate its client's employees, customers, partners, and suppliers, and their devices, and enable that model to continue into infinity to each subsequent organization's employees, customers, partners, and suppliers and their devices.

No other organization possesses partner relationships with the many types of disparate partners across various industries in the innovative platform and model. In the case of the few who do have a partner, it is usually a technology partner.

None of these organizations have a product and service marketplace as part of their model. The vast majority have just products. Planet Cents™ includes everything from bamboo toilet paper to recycled furniture to green landscaping services, and environmental consultants.

No other organization has a university, (in this case, a climate change one,) as part of their platform and model—and combined with a volunteer portal and marketplace.

Most of these volunteer organizations focus on non-profit beneficiary/host organizations, and not on for-profit bootstrapped startups in this space. In contrast, the innovative platform is configured to integrate with both types of organizations and startup as its beneficiaries, e.g., in the beneficiary category or role.

Some organizations may mention that their volunteering solution yields the advantage of helping companies attract, engage, and retain employees, and facilitate employee giving, etc. However, none engage or integrate the many companies in those spaces, and many more employee- and customer-related spaces. The platform may include partners is a variety of function-, issue-, and product and service-based categories.

As an additional contrast, no existing company has two-way referral mechanisms which drive business to/from the partners in the model. The platform is configured so that each of these partners may bring client traffic into the system or model, while also being the recipient of products and services from other partners in the model. This not only increases revenue for all involved, but helps drive more volunteers out into the world.

No other organization has partnerships with companies in all of the following areas, including, but not limited to, employee benefit consulting, CSR and ESG measurement and calculation, environmental education, employee and customer loyalty/recognition/reward, media, employee giving, environmental products/services, recruitment, technology, etc.

No other organization includes a variety of volunteer organization partners in their models. In contrast, the innovative platform does so. This inclusion or integration allows for a broader range of choices and lengths of assignments, age ranges, etc.

Due to the fact that climate change is a huge driver of homelessness and poverty, this may be the secondary focus of the platform (e.g., Planet Cents™). No other volunteer organizations have such two focus areas.

There are no other organizations which integrate or blend all of the components as in the innovative platform or model.

In an embodiment, it should be appreciated that the following partners that may be integrated into the platform may be the closest to services related, but they are not competitors. They are companies which can perform functions and/or offer services and/or products in the platform.
 a) Volunteer Partners: volunteer matching companies: Those in this space are only a handful, below. Some of them would be in the Education Partners area as well.
  a. Corporation for National and Community Service (AmeriCorps)—https://www.nationalservice.gov/
  b. Mercy Corps—https://www.mercycorps.org
  c. Moving Worlds—https://movingworlds.org/
  d. Peace Corps—https://www.peacecorps.gov
  e. Remote Year—https://remoteyear.com
  f. Volunteer Match—https://www.volunteermatch.org
  g. Year Up—https://www.yearup.org/
 Technology Partners: This is a small group of companies who play in this space, and each does different and similar things.
  a. Benevity (a technology platform provider)—https://www.benevity.com/
  b. Charity Navigator (a non-profit evaluation service)—https://www.charitynavigator.org
  c. Goodera (a technology platform provider)—https://goodera.com/us/
  d. Mobilize (a.k.a. Mobilize America) (a technology platform provider)—https://join.mobilize.us/
  e. Culture Amp— (employee engagement platform)
 Education Partners: (some are also Beneficiaries) (This list is only a fraction of many.)
  a. Climate Change Institute—https://climatechange.umaine.edu/
  b. Climate Leadership Network—https://secondnature.org/signatory-handbook/climate-leadership-network-map/
  c. Climate University—https://blogs.helsinki.fi/climate-university/
  d. Foundation for Climate Restoration—https://foundationforclimaterestoration.org
  e. Institute of the Environment—https://www.environment.arizona.edu/climate
  f. Pachamama Alliance—https://www.pachamama.org/
  g. Project Drawdown's Drawdown Learn: https://drawdown.org/programs/drawdown-learn
  h. Rocky Mountain Institute—https://rmi.org/
  i. Second Nature—https://secondnature.org/initiative/uc3-coalition/
  j. Stanford University's Stanford Earth: https://earth.stanford.edu/climate-change-ed
  k. Sustainability Learning Centre—https://www.sustainabilitylearningcentre.com/
  l. The Earth Institute—https://www.earth.columbia.edu/articles/view/1791
  m. TBLI Group—http://www.tbli.org/
  n. University of CA—Climate Neutrality Initiative/Climate Lab—https://www.universityofcalifornia.edu/climate-lab
 List of MANY others who can contribute:
 https://www.timeshighereducation.com/student/best-universities/top-universities-climate-action#survey-answer
 Products and Services Partners:
 Every company in the environmental and sustainability products and services space—there are thousands. This can include both B2B and B2C direct manufacturers of products and providers of services.
 This area also includes companies which act and clearinghouses and/or marketplaces of goods and services, including, but not limited to those below.
  a. Cloud of Goods—(an online rental platform)—https://www.cloudofgoods.com/
  b. Fairzone Green—(online B2B platform)—no site yet
  c. Good Carts (online network of retailers)—https://goodcarts.co
 This area includes benefits consulting firms and associations, including, but not limited to:
  a. Buck—www.Buck.com
  b. Health Strategy LLC—www.healthstrategyllc.com/??
  c. FocusHR—www.focushr.net
  d. Benefits Association—www.BenefitsAssociation.com
 This area includes most major unions:
 https://en.wikipedia.org/wiki/List_of_labor_unions_in_the_United_States
 This area includes faith-based organizations:
 https://www.pewforum.org/religious-landscape-study/
 This area includes environmental activist organizations:

a. https://www.gigaranking.com/top-environmental-organizations/#:~:text=1%20World%20Wide%20Fund%20for%20Nature%20%28WWF%29%202,9%20Natural%20Resources%20Defense%20Council%20%28NRDC%29%2010%20350
b. https://greendreamer.com/journal/environmental-organizations-nonprofits-for-a-sustainable-future
c. https://en.wikipedia.org/wiki/List_of_environmental_organizations This area includes employee engagement companies, including but not limited to:
a. Tiny Pulse—www.TinyPulse.com
b. https://vendordirectory.shrm.org/category/testing-surveys/employee-engagement-surveys This includes customer loyalty program providers, including but not limited to:
a. Capitol Marketing—www.capitolmarketing.com
b. Virtual Incentives—www.virtualincentives.com
c. Incentive Concepts—www.incentiveconcepts.com This includes recognition and rewards companies, including, but not limited to:
a. Blueboard—www.Blueboard.com
b. Qarrot—www.qarrot.com
c. Others: https://www.selectsoftwarereviews.com/employee-rewards-recognition This includes teambuilding providers, including, but not limited to:
a. Synergy Learning Systems—www.synergylearningsystems.com
b. Others: https://snacknation.com/blog/team-building-companies/

This includes employment outsourcing companies, which include recruitment and benefits consulting, including, but not limited to:
a. Accenture—www.Accenture.com
b. Ceridian—www.Ceridian.com
c. Aon Hewitt—www.AonHewitt.com
d. This area would also include all of the major HR associations.

This includes CSR and ESG measurement companies, including, but not limited to:
a. Acuity KP—www.AcuityKP.com
b. CSRHub—https://www.csrhub.com/
c. CSRware—www.CSRware.com Media Partners: These are specifically organizations in the environmental, sustainability, or Triple Bottom Line (3BL) arenas. Some of MANY examples include:
a. 3BL Media—https://www.3blmedia.com/
b. Grist—www.Grist.org
c. Inside Climate News—https://insideclimatenews.org/
d. Yale Climate Connections—https://www.yaleclimate-connections.org It should be appreciated that the forgoing is not an exhaustive list of potential partners.

Figure 19:
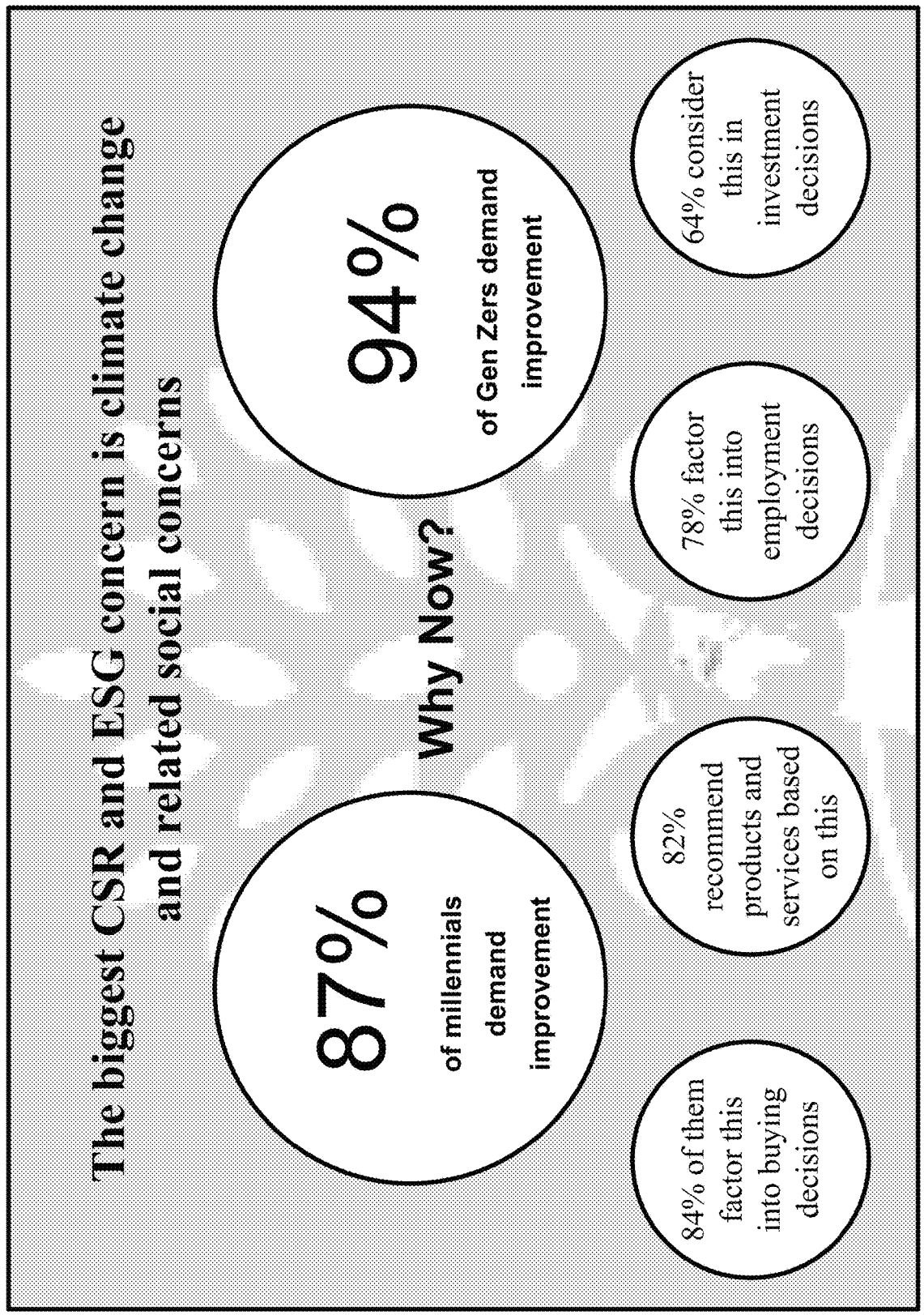
FIG. 19 is a schematic diagram depicting how CSR and ESG are related to the innovation, in accordance with an embodiment.
Figure 20:
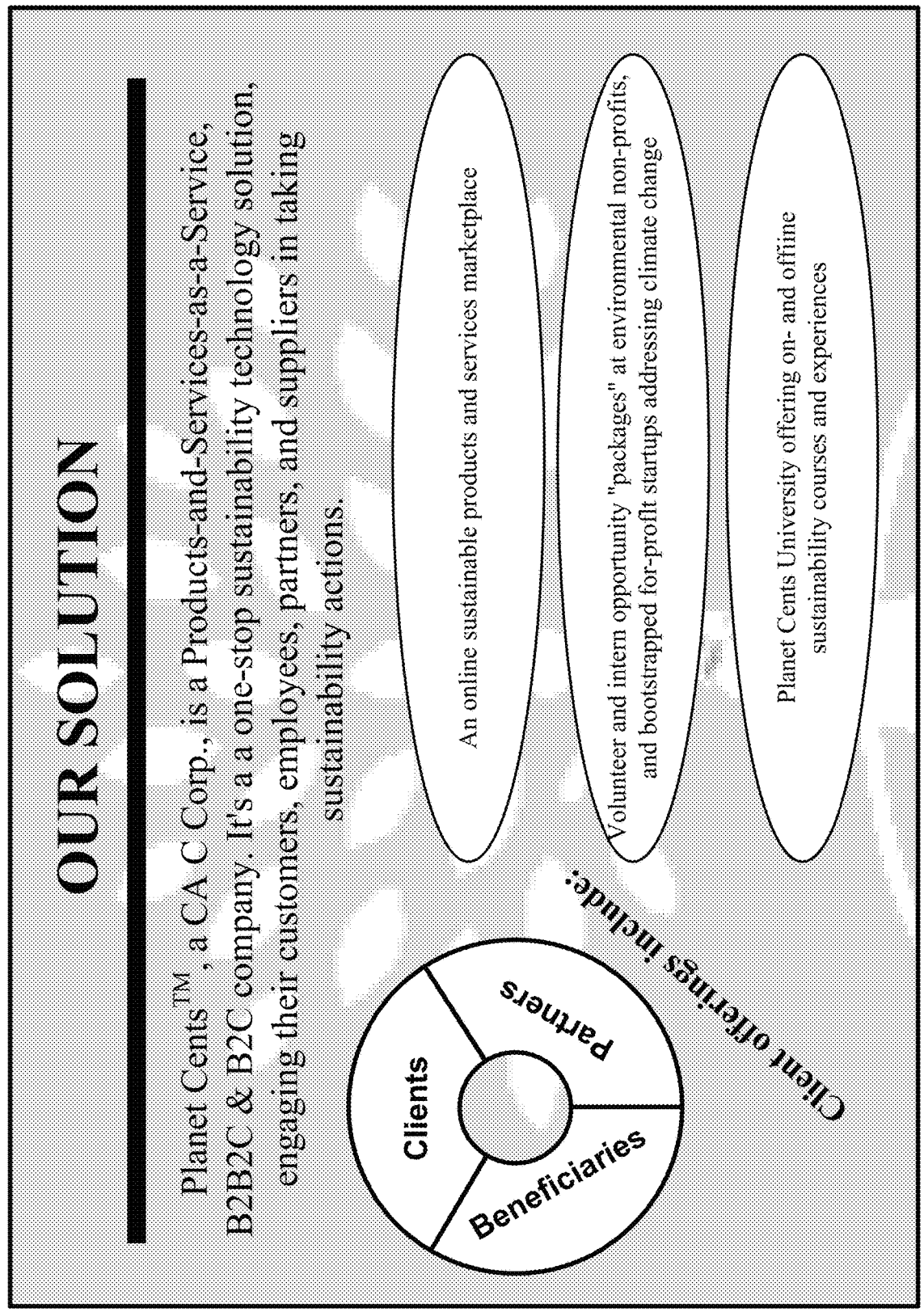
FIG. 20 is a schematic diagram depicting a high-level description of a solution, in accordance with an embodiment.
Figure 21:
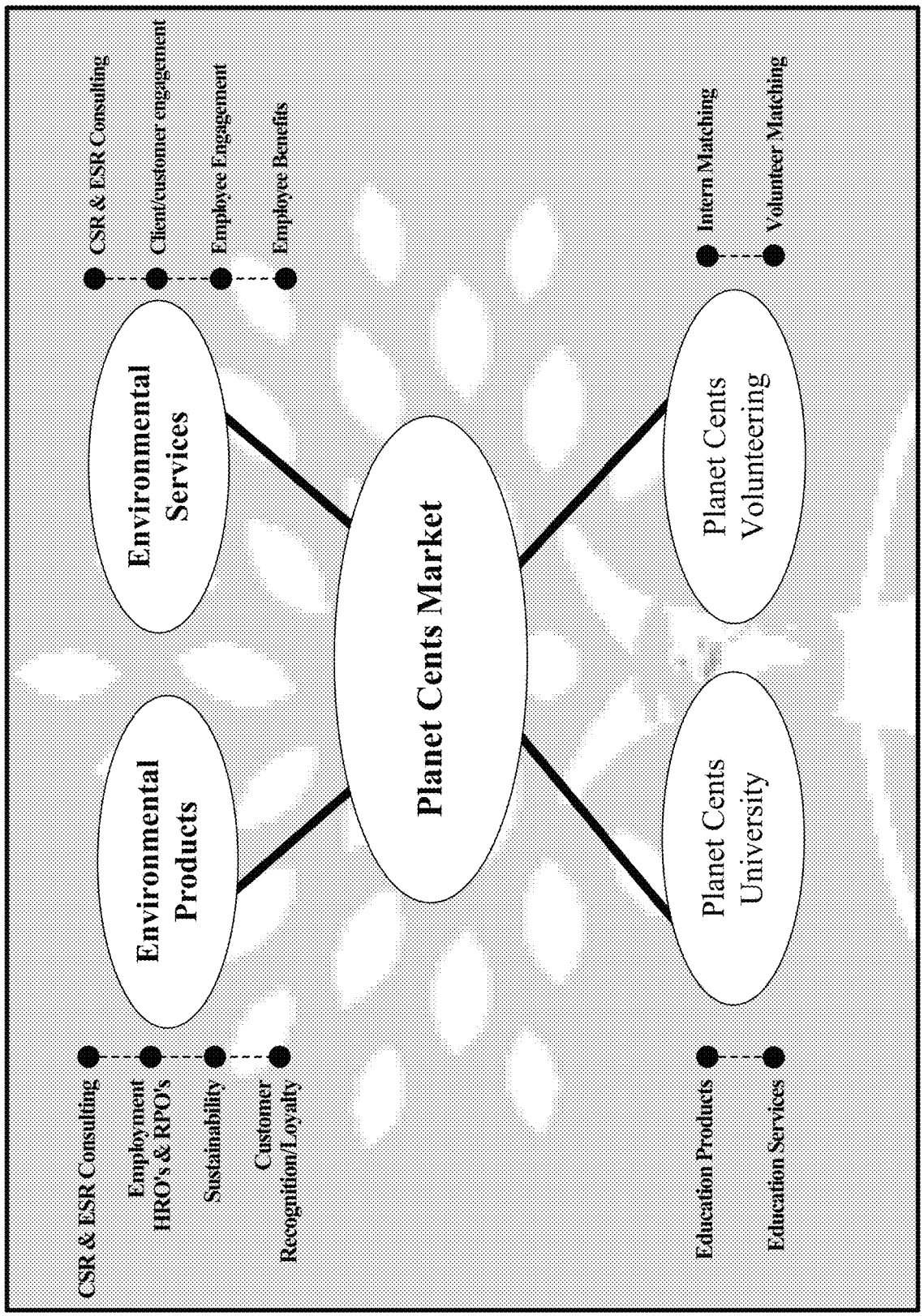
FIG. 21 is a schematic diagram depicting invested parties of the hub that are communicably connected via a network to the marketplace platform, in accordance with an embodiment.
Figure 22:
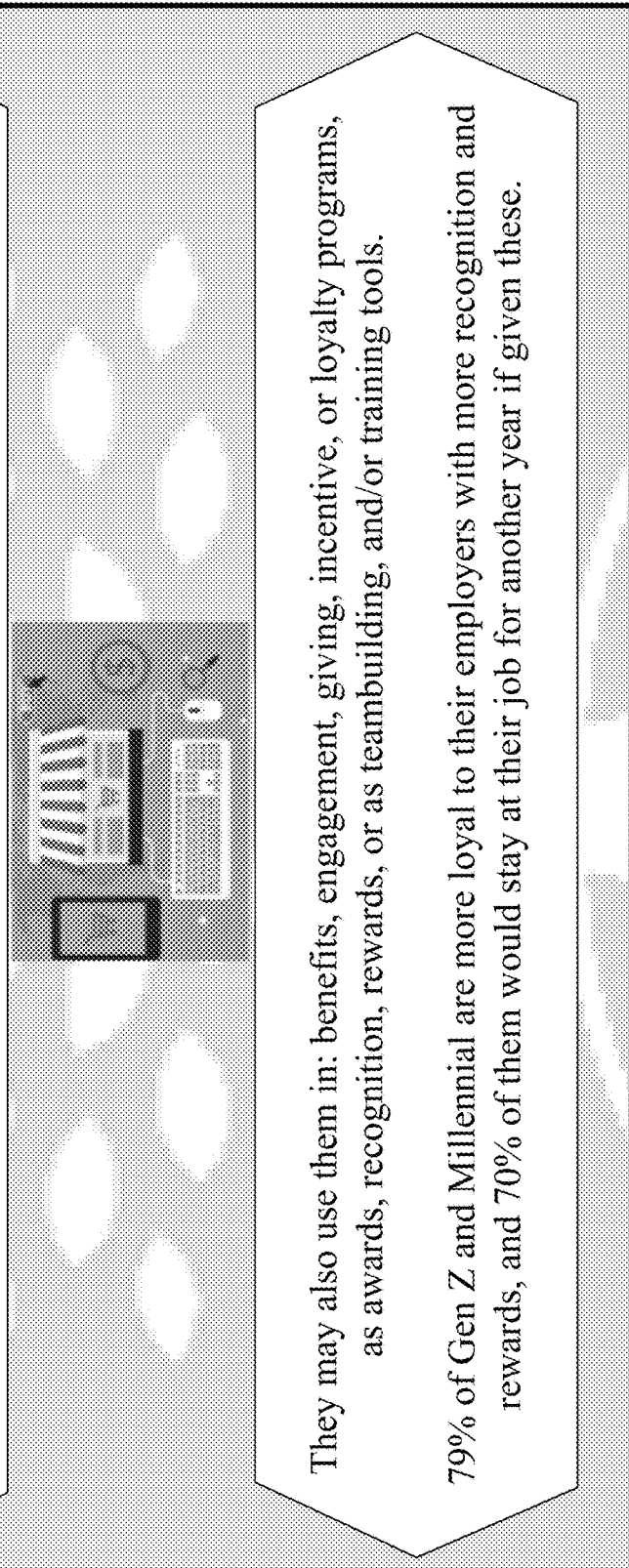
FIG. 22 is a schematic diagram depicting a high-level overview of the innovation's offered products and services, in accordance with an embodiment.
Figure 23:
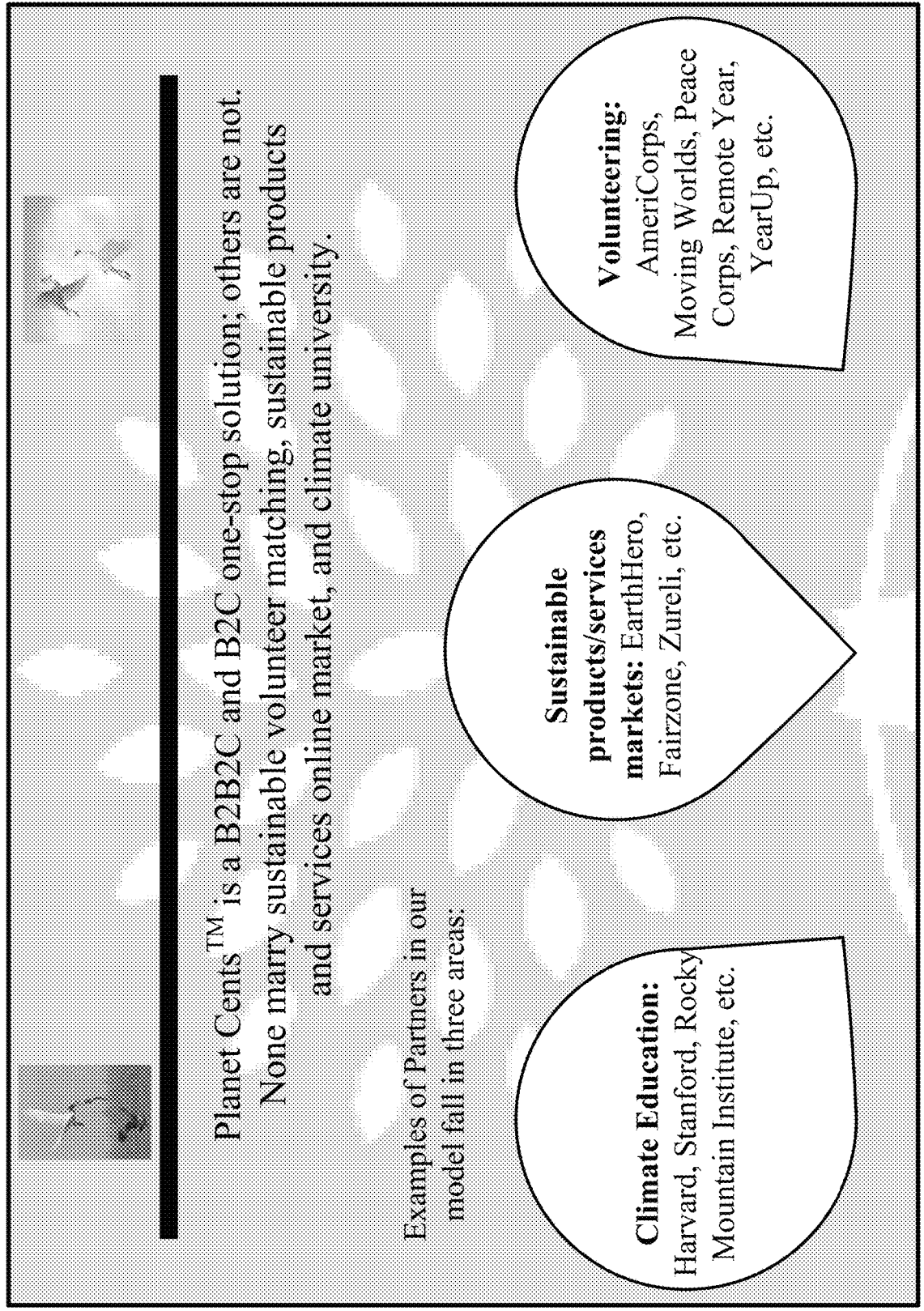
FIG. 23 is a schematic diagram depicting some examples of partners of the platform, in accordance with an embodiment.
Figure 25:
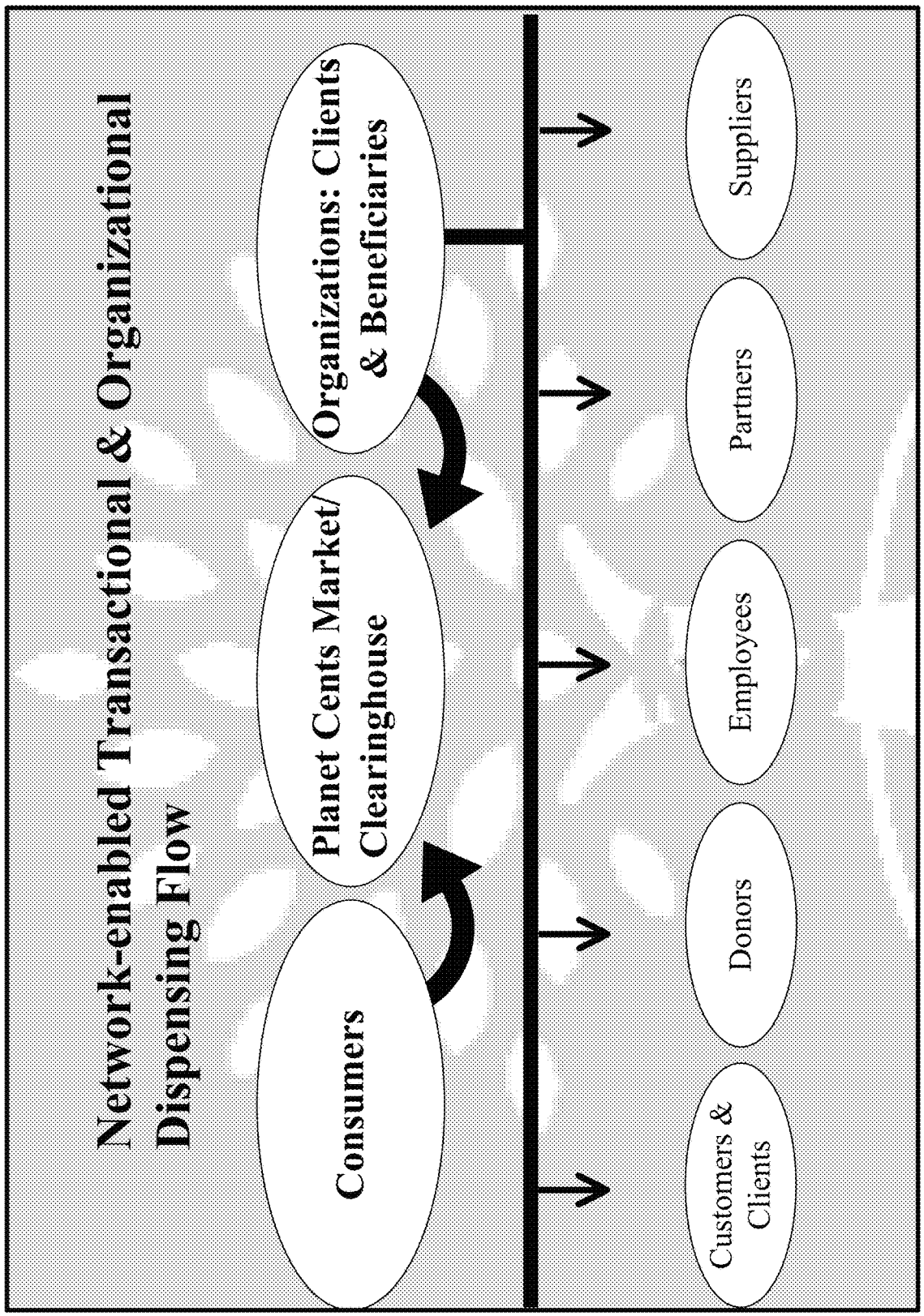
FIG. 25 is a schematic diagram showing some components of the platform, communicably connected via a network, and their interacting capabilities, at a high level, in accordance with an embodiment.
Figure 26:
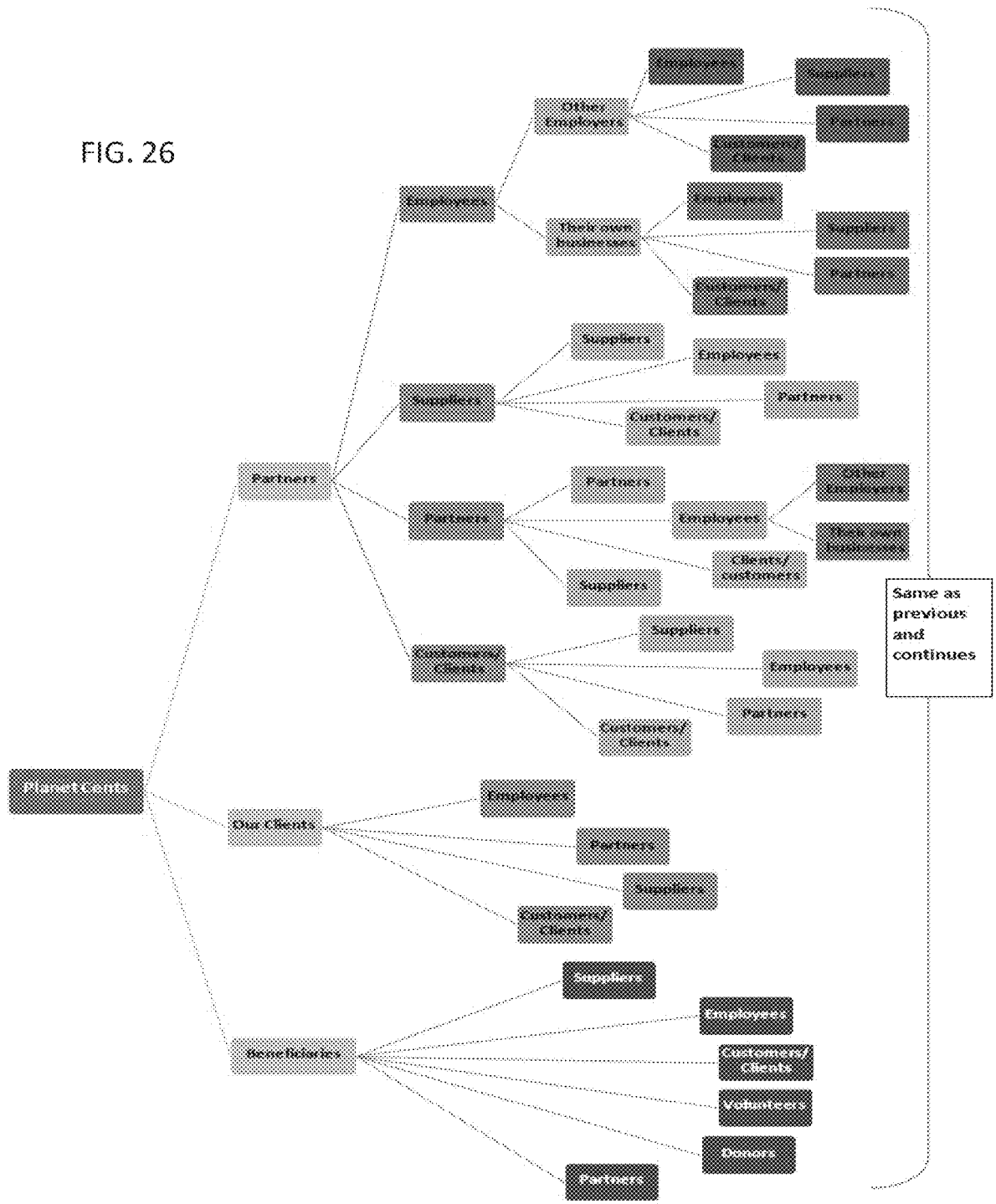
FIG. 26 is a schematic diagram showing how the platform may be configured to support the propagating potential of package transactions from member users (e.g., partners, clients, and beneficiaries) to others, at a high level, in accordance with an embodiment.

Embodiments of the innovative platform may be understood with reference to FIGS. 18-26. FIG. 18 provides a high-level description of some of the problems. FIG. 19 depicts how CSR and ESG are related to the innovation. FIG. 20 depicts a high-level description of a solution. FIG. 21 is a schematic diagram depicting invested parties of the hub that are communicably connected via a network to the clearinghouse or market component of the innovation. FIG. 22 depicts a high-level overview of the innovation's offered products and services. FIG. 23 depicts some examples of partners of the platform. FIG. 24 depicts a possible fee structure regarding the packages as offered by the hub. FIG. 25 is a schematic diagram showing some components of the platform, communicably connected via a network, and their interacting capabilities, at a high level. FIG. 26 is a schematic diagram showing how the platform may be configured to support the propagating potential of package transactions from member users (e.g., partners, clients, and beneficiaries) to others, at a high level.

An Exemplary Embodiment of a Purchasing, Delivery, Usage and Tracking Technology Platform Embodiments of the innovation may be understood with reference consumer and organization's perspective and platform portals, as described below. Also, FIGS. 18-26 may be referenced for understanding, as well.

Sellers Portal:

In the sellers part of the model sellers, (be they for- or non-profit, private or public,) have the ability to sell their products and services, using a proprietary technology platform and algorithms. This includes tangible goods and services, education courses, degree-programs, and educational experiences, as well as volunteering opportunity packages.

The goods and services may be anything from buying a yard compost bin, to hiring a green architect, to taking a course on installing a solar system, to engaging in hands-on permaculture educational experiences, to recycled toilet paper.

The purchasing mechanism is a proprietary online platform, utilizing proprietary algorithms, where sellers can sell their goods and services. The proprietary technology platform and its algorithms manage and track all purchases, their type(s), location(s) involved, order size, listing quantities and fees, markup fees, shipping, delivery, etc.

Consumers Portal:

In its Direct-to-Consumer (DTC), part of the model consumers have the ability to purchase products and services, by making choices on a proprietary technology platform and algorithms. This includes tangible goods and services from the platform's partners. In addition to tangible products, consumers may also purchase education courses, degree-programs, and educational experiences. They may also purchase volunteering opportunity "packages." They may purchase items for themselves, their businesses, or others.

The goods and services may be anything from buying a yard compost bin, to hiring a green architect, to taking a course on installing a solar system, to engaging in hands-on permaculture educational experiences, to recycled toilet paper.

The purchasing mechanism is a proprietary online platform, utilizing proprietary algorithms, where consumers can search from categories for what they want. Like other online shopping portals, they put items in their shopping carts and check out. This action relays the data to the company, indicating whether they purchased products, services, or both.

The products may be shipped to them using proprietary technology. On the other hand, services purchases may be relayed and routed to a customer support ambassador and/or account executive, (depending on the type of service,) to begin the setup and delivery of the service. In some cases, the consumer may simply work with a customer support ambassador. In other cases, involving complexity, volume, and other factors, they may work with both.

The proprietary technology platform and its algorithms manage and track all purchases, their type(s), location(s) involved, order size, shipping, delivery, education and volunteering partners engaged in the services delivered, etc. In the case of education, educational and volunteer opportunities, aspects of those services (e.g., packages) are tracked and managed on the technology platform. This includes what partner may be engaged, the location of the education and/or volunteering experience(s), the number of students and/or volunteers engaged, where they are involved geographically or virtually, etc.

Organizations Portal:

Organizations (e.g., business organizations), be they for- or non-profit, private or public, go to the portal to purchase goods and services. Similar to the DTC side, they may search the lists of goods and services, and choose those they want, and put them in their cart and check out. Much like the DTC customer, they are then prompted to take steps to initiate and complete their service purchases.

During this process, the portal may ask some screening questions to discern the size of their business, their industry, number of employees, problem(s) they have, and what they are looking to solve, annual revenue, the number and size of partners and suppliers they have, etc. Based on the size and complexity of the organization and its problems, the innovative algorithm discerns what level of support and the kind of follow up required.

At this juncture, the platform's proprietary technology redirects them either directly to a customer support ambassador and/or account executive. Smaller businesses may be directed to customer support agents, live or via email or text, according to the customer's preference. Large enterprise clients may get a high-touch, very personalized account executive who may onboard them. This process may require deep discovery of their unique problems and challenges, their needs, and what they are trying to accomplish, and why. It may also yield information about potential upsell opportunities.

The proprietary technology platform and its algorithms manage and track all purchases, their type(s), location(s) involved, order size, shipping, delivery, education and volunteering partners engaged in the services delivered, etc. In the case of education, educational and volunteer opportunities, aspects (e.g., packages) of those services are tracked and managed on the technology platform. This includes what partner is engaged, the location of the education and/or volunteering experience(s), the number of students and/or volunteers engaged, where they are involved geographically or virtually, etc.

In an embodiment as may be implemented by FIGS. 18-26, a method is provided for facilitating climate change and global warming volunteerism by offering multiple volunteer packages to the for-profit organization that elucidates the process of performing climate change-related volunteer work with a non-profit organization or a start-up entity deficient in resources. The method works to marry a for-profit entity, such as a corporation, with a non-profit organization that works in the field of climate change and global warming. In alternative embodiments, the method marries the for-profit organization with a start-up that works in the field of climate change and global warming, yet does not have the resources, employees, or know-how to optimize the volunteer work.

In one possible embodiment, the method involves vetting a for-profit organization to determine an appropriate basket of climate change-related volunteer packages. The method then allows the for-profit organization to choose from the basket of climate change-related volunteer packages, serving as a clearinghouse to fit the needs of a corresponding for-profit organization. Next, the for-profit organization selects the most appropriate volunteer package. The volunteer package involves sending employees to a volunteer project, commensurate with the selected package, with the non-profit organization or the start-up. The for-profit organization benefits by demonstrating to consumers an awareness of climate change. The non-profit organization or the start-up receive the benefit of skilled, generally highly educated volunteers.

In an embodiment, many products and services may involve energy. Such products and services may include smart sensors, which may detect levels of energy and may transmit measurements of energy through the network to the hub. The hub may include a sensor processor, which may be programmed to measure inputted signals from the sensors against predetermined thresholds for measuring the CSR and ESG outcomes. For example, a GHG mitigating product may have a sensor that periodically sends signals to the hub. Such signals may then be measured by the hub processor and determined, using a predetermined threshold, whether the level of GHG is below a maximum value. If so, the hub processor may further set a flag that such product is meeting good CSR and ESG practices. Thus, the platform is configured to measure CSR, ESG, volunteering, and educational impacts.

In an embodiment, the platform may be configured for reserving future goods, services, or events. This is due to the platform being configured such that in addition to buying, a member user may indicate interest in a product or a service. In an embodiment, a feature is added to the platform where people could reserve things and leave them in a container similar to a shopping cart. The platform uses a network and may reside on a server.

In an embodiment, the platform includes methods and systems of tracking and measuring CSR and ESG impact, that is, collecting and calculating data related to CSR and ESG. The majority of climate change activities, (which fall under ESG,) may involve the ultimate reduction or elimination of greenhouse gas (GHG) emissions. The platform may create or use any action which is known to reverse or eliminate climate change. The platform may integrate third-party solutions/areas which are involved, e.g., those at www.drawdown.org. Any one of the innovation's beneficiaries, partners, and client organizations may be involved in one or many of these, based upon where they send their volunteers and/or products and services they buy in our marketplace or university. For instance, an organization might have a particular bent for making an impact in the built environment, e.g., buildings and all related to them. As such they might just want organizations doing things in that realm, e.g., building green homes with Habitat for Humanity. They might buy products in the platform's marketplace like energy-efficient HVAC systems, and might buy services like hiring green architects to work on their next building project. And in the innovation's university, they might allow their customers, employees, partners, and suppliers to take courses specific to that area.

In an embodiment, the platform may be configured to:
1. Identify climate change focus area
2. Collect information on each solution in that area
3. Enter information into system
4. Store information in database
5. Review and vet solutions
6. Manage and track the activity on tech platform.

In an embodiment, some partners may have programmable devices, tracking devices, and financial accounts. Carbon offsetting may be one of the many climate change reversal solutions offered. A carbon offset partner the platform may have might include the buying and tracking of carbon credits and credit accounts. This same fact may hold true for many of the solutions which may fall under different categories.

In an embodiment, the platform may be configured also to track activity, such as but not limited to:
1. On the volunteering side: the client offering the volunteer, length, location and type of assignment and at what beneficiary they are to be placed.
2. On the marketplace side: who bought what, how many, from whom, etc.
3. On the university side: things related to educational products and services. In the case of services, tracking who buys what and from whom, (e.g., Company A buys sustainability courses and books from University A.) The platform may also track how many of products, services, students, etc.

Also tracking satisfaction on the part of the Client, Beneficiary, and Partners may be tracked on the platform and providing alerts, notifications, and suggestions for making needed changes.

Some Exemplary APIs

In an embodiment, the platform is a computer-aided or supported method in that it is a web-based platform that manages and tracks the things related to the platform's offerings. In an embodiment, the informational data to be tracked are contained in specific data structures. For example, each member's profile is a particular type of data structure, with the appropriate data therein. Each type of member (such as consumer, volunteer, client, seller, partner, supplier, and beneficiary) has a preprogrammed data structure and each member is associated with a data structure instance. The offerings or packages also may be embodied as a predetermined type of data structure and a specific offering is an instance of that data structure. The data from these data structures are shared, updated, removed, and so on via APIs. These APIs embody the specific rules for the parties (e.g., volunteers, beneficiaries, and partners) to offer packages, accept packages, obtain rewards, redeem rewards, transfer rewards and packages, and so on, via the platform and over the network. For example, the APIs enable the volunteer to look at the offers by accepting input values from the volunteer and going to the database to search for and present compatible volunteer opportunities. The APIs also go to the database and obtain the volunteer's profile and its Planet Cents™ or currency activity, as embodied in a data structure. The APIs enable the acceptance of the volunteer opportunity to be announced to the interested parties, such as the beneficiary and possibly the partner. The APIs go to the database to find their respective informational data as stored in corresponding profiles. The APIs enable the details of the volunteer opportunity to be provided to such other parties and also updates their currencies and CSR and ESG measures, as appropriate. Further, the APIs also enable the two-way referral mechanisms, which drive business to/from the partners in the platform. The APIs enable a partner to bring client traffic into the system and also enable the partner to be the recipient of products and services from other partners in the hub.

It should be appreciated that the innovation has an expansive list of vetting criteria, (over 200,) both on products, services, and the organizations selling them. The criteria include commonly-known ones like Fair Trade, Forest Sustainability Council, (FSC) certified, organic, etc. Additionally, it encompasses the tenets of the UN's Sustainable Development Goals (SDG's) as well as those in the Ecolabel Index. This list is intended to educate as well as to incentivize organizations to:

Attract and retain customers, employees, investors, partners and suppliers using sustainable purchasing and green technology;

Green and consolidate their entire supply chain with attention to CSR principles like Fair Trade, slavery free, organics, GMO Project Verified, etc.;

Green their consumers, employee, partners, and suppliers;

Incentivize the purchasing of green products and services;

Incentivize customer and employee fundraising, giving engagement;

Incentivize and increase consumer, customer, employee, partner, and supplier volunteering;

Incentivize and increase consumer, customer, employee, partner, and supplier educational pursuits;

Incentivize and increase consumer, customer, employee, partner, and supplier engagement;

Incentivize and increase consumer, customer, employee, partner, and supplier teambuilding; and Incentivize and increase consumer, customer, employee, partner, and supplier relationships.

The innovation may be understood with reference to the following example. Suppose a member client of the platform, or a partner of theirs, does not have an employee engagement program. Such member may review those offered by the hub and buy their products and/or services. On the platform, there may be providers who only offer services and those who offer both products and services. There may be membership fees, sign up requests by email, requests for password, etc. The platform may be configured to ask some screening questions as to whether the user is there as a consumer, organization, etc., and if the latter, the size of co. in terms of employees, revenue, budget, etc. The APIs that gather this information reduce the amount of bandwidth or load balancing that would otherwise be required for enterprise companies who need a much higher level of touch, and companies are then matched with account executives (AE), matching their size with the experience level of the AE.

In an embodiment, the platform is configured to be standalone. In another embodiment, the platform may be configured to incorporate or integrate with a partner's platforms, including requiring that the partner's platforms be customized and expanded to the innovative platform's specifications. In an embodiment, the standalone or integrated embodiments may be consistent with rapid scale and less time to build, which may be important in light of the planet's crisis.

An Example Machine Overview

FIG. 27 is a block schematic diagram of a machine in the exemplary form of a computer system 2700 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 2700 includes a processor 2702, a main memory 2704 and a static memory 2706, which communicate with each other via a bus 2708. The computer system 2700 may further include a display unit 2710, for example, a liquid crystal display (LCD) or a cathode ray tube (CRT). The computer system 2700 also includes an alphanumeric input device 2712, for example, a keyboard; a cursor control device 2714, for example, a mouse; a disk drive unit 2716, a signal generation device 2718, for example, a speaker, and a network interface device 2728.

The disk drive unit 2716 includes a machine-readable medium 2724 on which is stored a set of executable instructions, i.e. software, 2726 embodying any one, or all, of the methodologies described herein below. The software 2726 is also shown to reside, completely or at least partially, within the main memory 2704 and/or within the processor 2702. The software 2726 may further be transmitted or received over a network 2730 by means of a network interface device 2728.

In contrast to the system 2700 discussed above, a different embodiment uses logic circuitry instead of computer-executed instructions in order to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine-readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to purchase a product within the video on such internet-enabled or other network-enabled devices, servers, or clients. It further should be appreciated that one or more cloud computing embodiments include purchasing within the video using mobile devices, tablets, and the like, as such devices are becoming standard consumer devices.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A system comprising:
   non-transitory computer readable medium storing computer readable instructions;
   a processor executing the instructions to implement a network-accessible platform, the network-accessible platform comprising:
   an input and computing processor configured to receive vetting parameters, criteria parameters, and certification parameters of entities intending to offer sustainable products and services, and further configured to compute climate impact measurement, rating, and badge elevation output parameters by processing the vetting parameters, the criteria parameters, and the certification parameters;
   a sustainable products and services offering processor configured to receive informational input parameters about the sustainable products and services and further configured to offer the sustainable products and services in the form of benefits, gifts, incentives, recognition, rewards, engagement, teambuilding, teambuilding, and training tools;
   a generating, monitoring, and updating processor configured to generate, monitor, and update purchasing funds and offering flows in response to purchases or offerings of the sustainable products and services;
   a sharing processor configured to receive informational input parameters about further shares of sustainable products and services or of the offering of benefits, gifts, incentives, recognition, rewards, engagement, teambuilding, and training tools to contacts in their respective social or digital networks, the sharing processor further configured to monitor how each recipient of the sustainable products and services or of the offering of benefits, gifts, incentives, recognition, rewards, engagement, teambuilding, and training tools further shares sustainable products and services or of the offering of benefits, gifts, incentives, recognition, rewards, engagement, teambuilding, and training tools to contacts in their respective social or digital networks, and the sharing processor further configured to communicating said monitored information on a display and to output the monitored information in digital notifications and reports to interested parties; and
   graphical user interfaces comprising a plurality of pages configured to:
   sort products and services by sustainable preference, price, and product or service category in a first page of the plurality of pages based on a user using, via a user computer device, a first graphical user interface control element of the first page;
   drill down into a view of one or more of the products and services in the first page based on the user using, via a user computer device, a second graphical user interface control element of the first page;
   enter details of a new product or service, using a second page of the plurality of pages, to add the new product or service to the platform for a company based on the company entering, via a company computer device, details using a third graphical user interface control element of the second page;
   upload image or video files of the new product or service to the platform, using the second page, to add the new product or service to the platform based on the company uploading, via the company computer device, the image or video files using a fourth graphical user interface control element of the second page; and display the climate impact measurement, at the user computer device and the company computer device, in an impact tracker display comprising an always-visible graphical user interface element on each page of the plurality of pages.

2. The system of claim 1, wherein the vetting parameters, criteria parameters, and certification parameters include any of: CarbonFree Certified, Carbon Neutral Certification, Climate Registered, Cradle to Cradle Certified, Energy Star, Green Seal, Upcycled Certification, Water Sense Certification, Ecocert, ECOLOGO, Global Green Tag Certified, Green Globe Certification.

3. The system of claim 1, wherein the input and computing processor is further configured to receive sustainability information and use the sustainability information to compute the climate impact measurement, rating, and badge elevation output parameters, wherein the sustainability information is defined as an assessment of a percentage of a company's sustainable versus non-sustainable products.

4. The system of claim 3, wherein the rating output parameters are listed so that sustainable companies having a highest ranking are listed in a display above companies having a lowest ranking.

5. The system of claim 1, wherein the input and computing processor is further configured to process a most and a least popular vetting criteria, who vetting partners are in each of a vetting category and an amount of organizational clients being sent to the vetting partners, channel partner activity including whose sustainable products and services are being sold or offered and to whom.

6. The system of claim 5, wherein packaging, shipping, and other related sustainable supply-chain partners data are processed, measured and tracked in real-time and the climate impact measurement, rating, and badge elevation output parameters are updated.

7. The system of claim 1, wherein the input and computing processor is further configured to, in response to receiving the vetting parameters, criteria parameters, and certification parameters, calculate items sold, at what price, how many were listed as compared to those sold, how sustainable an organization is as compared to other organizations and their respective sustainable products and services, additional or updated certifications, additional or updated rankings, when and where products were packaged and shipped, and concerns issues related to a respective company, wherein along with the vetting parameters and achievements are processed to output informational data to the impact tracker display, wherein the impact tracker display shows a level of environmental impact made by each organization.

8. The system of claim 1, wherein the input and computing processor is further configured to compute, in response to receiving a referral from an individual or an organization, an updated badge elevation output parameter.

9. The system of claim 1, wherein the input and computing processor is further configured to compute aggregates of most and least popular vetting criteria, kinds of companies achieving the most and least popular vetting criteria, highest achievers, badge escalation by both consumers and organizations, trends and underlying data on impact of buying on the platform, and wherein the input and computing processor is further configured to output monthly impact values of purchases made in terms of environmental impact.

10. The system of claim 1, wherein the sustainable products and services offering processor is further configured to receive, process, measure and track traditional data about a company including name, address, dates, items with number, type, and category, and information on the company's existing programs in areas of types, names, usage, partners and what each partner does, how the partners are used and not used and why, who the programs serve, current results, what programs the partners do not have and why, how the partners want and are using the platform, with whom and how many, how the programs are working and not working, and opportunities to increase the company's usage in areas where they are not using.

11. The system of claim 10, wherein the sustainable products and services offering processor is further configured to produce digital notifications and reports on the processed, measured and tracked data and further configured to output positive results at the company, the positive results reflecting the company's involvement with the platform.

12. The system of claim 1, wherein the input and computing processor is further configured to receive, from devices of parties including customers, employees, partners and suppliers of those organizations, informational data values related to relationships between the parties and of specifics related to those relationships including contracts, a nature of the contracts, between whom, which usages of gifts; employee benefit; employee, customer, partner and supplier incentive; recognition; reward; engagement; and teambuilding organizations employ, and with whom of: customer, employee, partner and supplier; and wherein the input and computing processor is further configured to use the received informational data in computing the climate impact measurement, rating, and badge elevation output parameters.

13. The system of claim 12, wherein the input and computing processor is further configured to receive, from devices of parties including customers, employees, partners and suppliers of those organizations, informational data values of their respective items to be sold, the informational data including names, types, categories, number of items, selling prices, discounts, and sales;

wherein the input and computing processor is further configured to receive, from devices of parties including customers, employees, partners and suppliers of those organizations, informational data parameters of sustainable products and services' sustainability, evidence of certifications, ratings, and rankings; and wherein the input and computing processor is further configured to use the received informational data in computing the climate impact measurement, rating, and badge elevation output parameters.

14. The system of claim 1, further configured to output digital notifications and reports showing measured aspects and elements of relationships of companies, their customers, employees, partners, and suppliers relative to their involvement with the platform; and wherein the digital notifications and reports show measured aspects of the platform's current activities, functionality, performance, measurements, and tracking.

15. The system of claim 1, further configured to receive sustainable products and services from partners, wherein partners are selling partners, channel partners, or sustainable marketplaces, technology partners, and vetting partners, wherein:

the selling partners sell sustainable products and services;
the channel partners sell sustainable services and non-sustainable services, for which the channel partners receive revenue from the platform;
the sustainable marketplaces include business-to-client (B2C) and business-to-business (B2B);

the technology partners embed their climate impact measurement tracking software and import technology into the platform; and the vetting partners input the following parameters: criteria, evidence/verification of certifications, rankings, and rating on a continuous basis, so that the parameters are used to track progress, elevate the badge level of sellers, and announce victories in high achievers.

16. The system of claim 1, further configured to receive sustainable products and services from channel partners, wherein the channel partners:

offer climate and sustainability education, wherein education ranges from classroom to outdoor experiential;

offer sustainable products and services marketplaces, allowing B2C partners access to B2B; and offer sustainable products and services providers.

17. A computer-implemented method implemented by a processor executing computer readable instructions implementing a network-accessible platform, the method comprising:

receiving, by an input and computing processor implemented by the processor, vetting parameters, criteria parameters, and certification parameters of entities intending to offer sustainable products and services, and computing, by the input and computing processor implemented by the processor, climate impact measurement, rating, and badge elevation output parameters by processing the vetting parameters, the criteria parameters, and the certification parameters;

receiving, by a sustainable products and services offering processor implemented by the processor, informational input parameters about the sustainable products and services, and offering, by the sustainable products and services offering processor implemented by the processor, the sustainable products and services in the form of benefits, gifts, incentives, recognition, rewards, engagement, teambuilding, teambuilding, and training tools;

generating, monitoring, and updating, by a generating, monitoring, and updating processor implemented by the processor, purchasing funds and offering flows in response to purchases or offerings of the sustainable products and services;

receiving, by a sharing processor implemented by the processor, informational input parameters about further shares of sustainable products and services or of the offering of benefits, gifts, incentives, recognition, rewards, engagement, teambuilding, and training tools to contacts in their respective social or digital networks, monitoring, by the sharing processor implemented by the processor, how each recipient of the sustainable products and services or of the offering of benefits, gifts, incentives, recognition, rewards, engagement, teambuilding, and training tools further shares sustainable products and services or of the offering of benefits, gifts, incentives, recognition, rewards, engagement, teambuilding, and training tools to contacts in their respective social or digital networks, and communicating, by the sharing processor implemented by the processor, said monitored information on a display and to output the monitored information in digital notifications and reports to interested parties; and configuring, by the processor, graphical user interfaces comprising a plurality of pages to:

sort products and services by sustainable preference, price, and product or service category in a first page of the plurality of pages based on a user using, via a user computer device, a first graphical user interface control element of the first page;

drill down into a view of one or more of the products and services in the first page based on the user using, via a user computer device, a second graphical user interface control element of the first page;

enter details of a new product or service, using a second page of the plurality of pages, to add the new product or service to the platform for a company based on the company entering, via a company computer device, details using a third graphical user interface control element of the second page;

upload image or video files of the new product or service to the platform, using the second page, to add the new product or service to the platform based on the company uploading, via the company computer device, the image or video files using a fourth graphical user interface control element of the second page; and display the climate impact measurement, at the user computer device and the company computer device, in an impact tracker display comprising an always-visible graphical user interface element on each page of the plurality of pages.

18. The method of claim 17, wherein the vetting parameters, criteria parameters, and certification parameters include any of: CarbonFree Certified, Carbon Neutral Certification, Climate Registered, Cradle to Cradle Certified, Energy Star, Green Seal, Upcycled Certification, Water Sense Certification, Ecocert, ECOLOGO, Global Green Tag Certified, Green Globe Certification.

19. The method of claim 17, further receiving, by the input and computing processor, sustainability information and use the sustainability information to compute the climate impact measurement, rating, and badge elevation output parameters, wherein the sustainability information is defined as an assessment of a percentage of a company's sustainable versus non-sustainable products.

20. The method of claim 19, wherein the rating output parameters are listed so that sustainable companies having a highest ranking are listed in a display above companies having a lowest ranking.

* * * * *